United States Patent
Zheng et al.

(10) Patent No.: US 9,008,174 B2
(45) Date of Patent: *Apr. 14, 2015

(54) METHODS AND APPARATUS FOR ILLUMINATION COMPENSATION OF INTRA-PREDICTED VIDEO

(75) Inventors: Yunfei Zheng, Plainsboro, NJ (US); Oscar Divorra Escoda, Barcelona (ES); Peng Yin, Ithaca, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 958 days.

This patent is subject to a terminal disclaimer.

(21) Appl. No.: 12/735,326

(22) PCT Filed: Jan. 9, 2009

(86) PCT No.: PCT/US2009/000110
§ 371 (c)(1),
(2), (4) Date: Sep. 21, 2010

(87) PCT Pub. No.: WO2009/089032
PCT Pub. Date: Jul. 16, 2009

(65) Prior Publication Data
US 2011/0007800 A1    Jan. 13, 2011

Related U.S. Application Data

(60) Provisional application No. 61/020,228, filed on Jan. 10, 2008.

(51) Int. Cl.
*H04N 7/32*        (2006.01)
*H04N 19/593*      (2014.01)
(Continued)

(52) U.S. Cl.
CPC .......... *H04N 7/34* (2013.01); *H04N 19/00763* (2013.01); *H04N 19/00024* (2013.01);
(Continued)

(58) Field of Classification Search
None
See application file for complete search history.

(56) References Cited

U.S. PATENT DOCUMENTS

| | | | | |
|---|---|---|---|---|
| 6,317,519 B2 * | 11/2001 | Dusseux | ........................ | 382/237 |
| 2001/0016076 A1 | 8/2001 | Dusseux | | |
| 2009/0257669 A1 * | 10/2009 | Kim et al. | ..................... | 382/238 |

FOREIGN PATENT DOCUMENTS

| | | |
|---|---|---|
| EP | 0858227 | 8/1998 |
| JP | 10248064 | 9/1998 |

(Continued)

OTHER PUBLICATIONS

Lopez, Joaquin; Kim, Jae Hoon; Ortega, Antonio; Chen, George; "Block-based illumination compensation and search techniques for multiview video coding" Proc. Picture Coding Symp. (PCS 2004) Dec. 2004 pp. 15-17.*

(Continued)

*Primary Examiner* — Chikaodili Anyikire
*Assistant Examiner* — Tyler W Sullivan
(74) *Attorney, Agent, or Firm* — Robert D. Shedd; Ronald J. Kolczynski

(57) ABSTRACT

There are provided methods and apparatus for illumination compensation of intra-predicted video. An apparatus includes an encoder for encoding a picture using non-local intra prediction. The encoder includes an illumination compensation processing unit for applying illumination compensation to predicted data obtained from the non-local intra prediction. Another apparatus includes a decoder for decoding a picture using non-local intra prediction. The decoder includes an illumination compensation processing portion for applying illumination compensation to predicted data obtained from the non-local intra prediction.

28 Claims, 16 Drawing Sheets

(51) Int. Cl.
  *H04N 19/105* (2014.01)
  *H04N 19/176* (2014.01)
  *H04N 19/102* (2014.01)
  *H04N 19/136* (2014.01)

(52) U.S. Cl.
  CPC ....... *H04N7/26244* (2013.01); *H04N 7/26015* (2013.01); *H04N 7/26122* (2013.01); *H04N 19/00278* (2013.01); *H04N 19/00139* (2013.01)

(56) References Cited

FOREIGN PATENT DOCUMENTS

WO  WO 2006033953 A1 *  3/2006
WO  WO2007081713        7/2007
WO  WO 2007094792 A1 *  8/2007

OTHER PUBLICATIONS

Thiow Keng Tan; Choong Seng Boon; Yoshinori Suzuki; "Intra Prediction by Template Matching," IEEE International Conference on Image Processing, 2006, pp. 1693-1696, Oct. 8-11, 2006.*

Li Song; Hongkai Xiong; JiZhen Xu; Feng Wu; Hui Su, "Adaptive predict based on fading compensation for lifting-based motion compensated temporal filtering," Proceedings IEEE International Conference on Acoustics, Speech, and Signal Processing, 2005 (ICASSP '05). pp. ii/909,ii/912 vol. 2, Mar. 18-23, 2005.*

Peng Yin; Tourapis, A.M.; Boyce, J.; "Localized weighted prediction for video coding," IEEE International Symposium on Circuits and Systems, 2005. ISCAS 2005. pp. 4365-4368 vol. 5, May 23-26, 2005.*

Chen, W.; Ding, L.; Chen; L.; "Fast Luminance and Chrominance Correction based on Motion Compensated Linear Regression for Multi-View Video Coding" Visual Communications and Image Processing 2007. Proceeding of SPIE—IS&T Electronic Imaging, SPIE vol. 6508.*

Balle et al., "Extended Texture Prediction for H.264 Intra Coding", ITU—Telecommunications Standardization Sector, Document: VCEG-AE11, 31st Meeting: Marrakech, MA, Jan. 15-16, 2007.

Yin et al., "Localized Weighted Prediction for Video Coding", IEEE International Symposium on Circuits and Systems, pp. 4365-4368, Piscataway, NJ, May 23, 2005.

Zheng et al., "Intra Prediction Using Template Matching with Adaptive Illumination Compensation", IEEE International Conference on Image Processing, pp. 125-128, Piscataway, NJ, Oct. 12, 2008.

Kim et al., "New Coding Tools for Illumination and Focus Mismatch Compensation in Multiview Video Coding", IEEE Transactions on Circuits and Systems for Video Technology, vol. 17, No. 11, pp. 1519-1535, Nov. 2007.

Boyce, Weighted Prediction in the H.264/MPEG AVC Video Coding Standard, Proceedings of the 2004 International Symposium on Circuits and Systems, pp. III-789, Piscataway, NJ, May 23, 2004.

Tan et al., "Intra Prediction by Template Matching", ICIP, 2006 IEEE, pp. 1693-1696.

Yu et al., "New Intra Prediction Using Intra-Macroblock Motion Compensation", JVT of ISO/IEC MPEG & ITU-T VCEG, Document: JVT-C151, 3rd Meeting: Fairfax, VA, May 6-10, 2002.

Intternational Telecommunication Union, "Advanced Video Coding for Generic Audiovisual Services", ITU-T H.264, Mar. 2005.

Search Report dated Jun. 7, 2009.

* cited by examiner

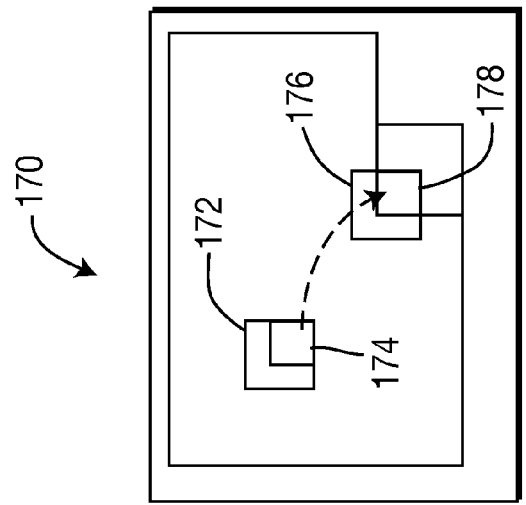
FIG. 1C (PRIOR ART)
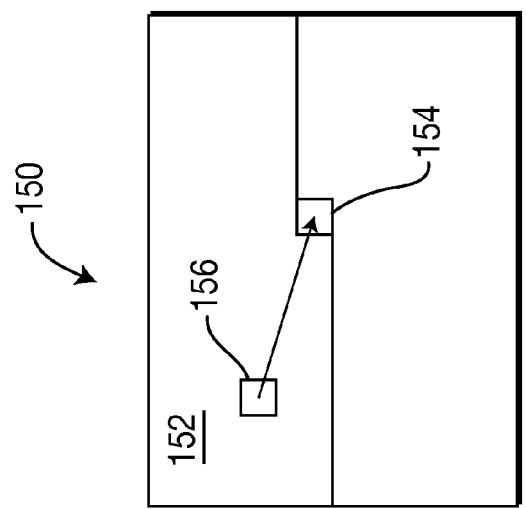
FIG. 1B (PRIOR ART)
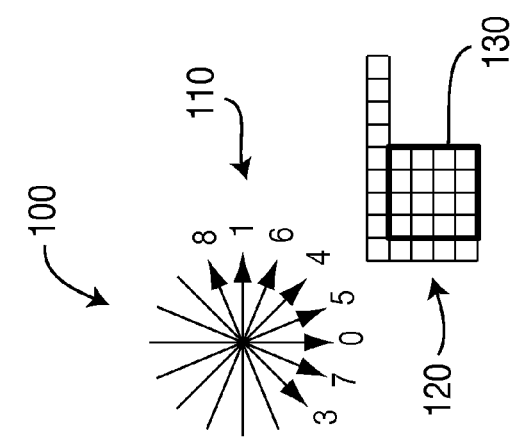
FIG. 1A (PRIOR ART)

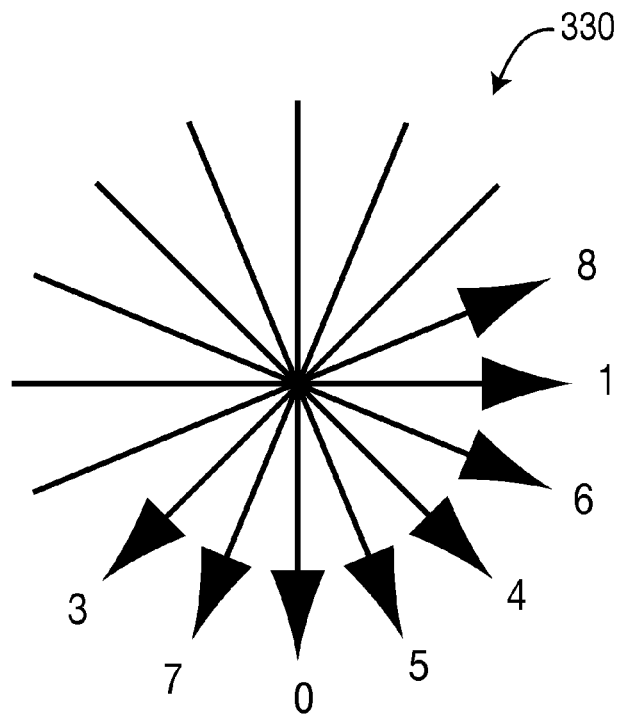
(PRIOR ART)
FIG. 2
(PRIOR ART)
FIG. 3A

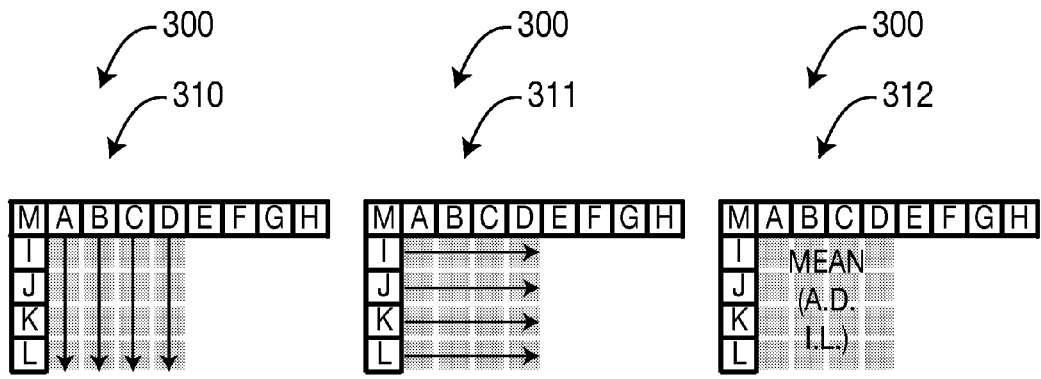
FIG. 3B (PRIOR ART)
FIG. 3C (PRIOR ART)
FIG. 3D (PRIOR ART)
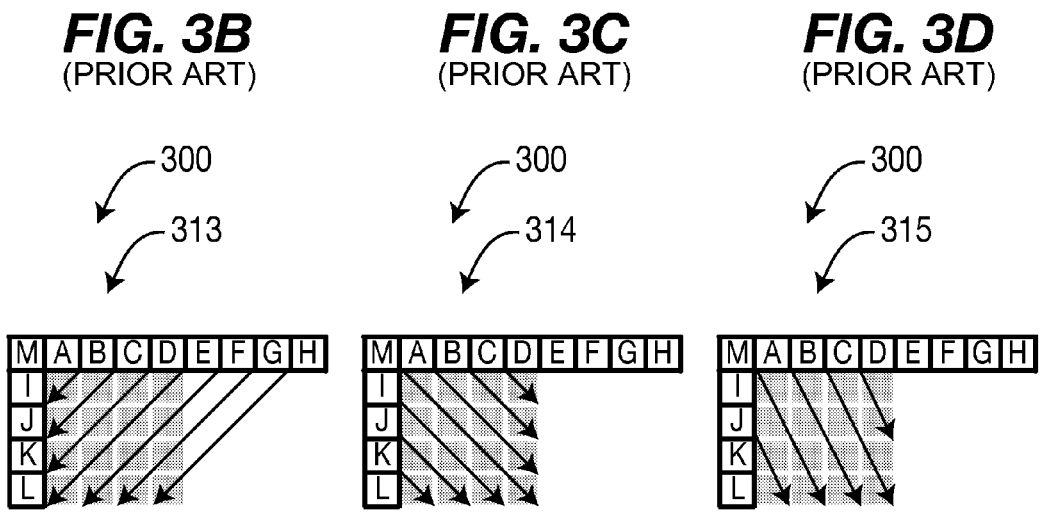
FIG. 3E (PRIOR ART)
FIG. 3F (PRIOR ART)
FIG. 3G (PRIOR ART)
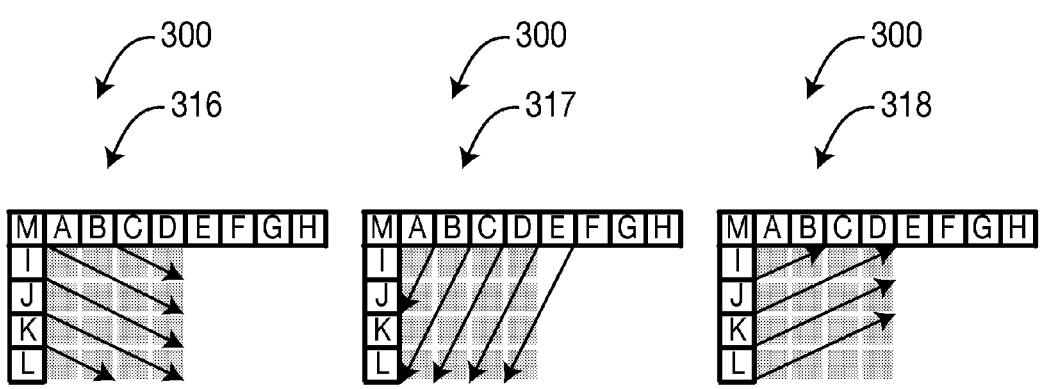
FIG. 3H (PRIOR ART)
FIG. 3I (PRIOR ART)
FIG. 3J (PRIOR ART)

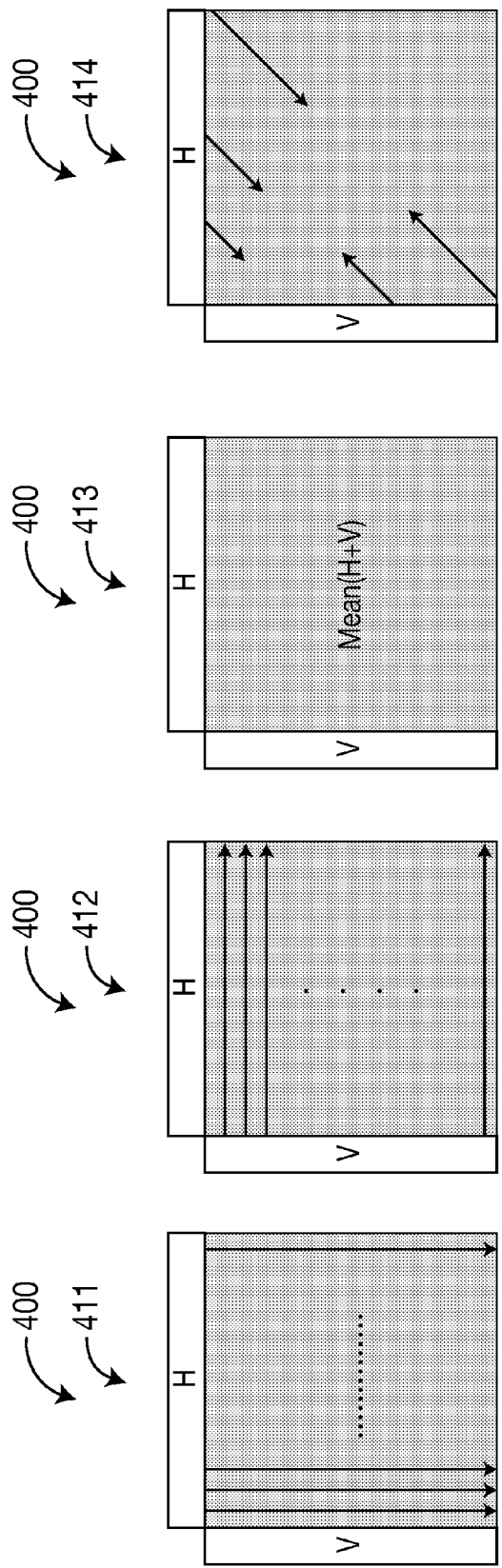

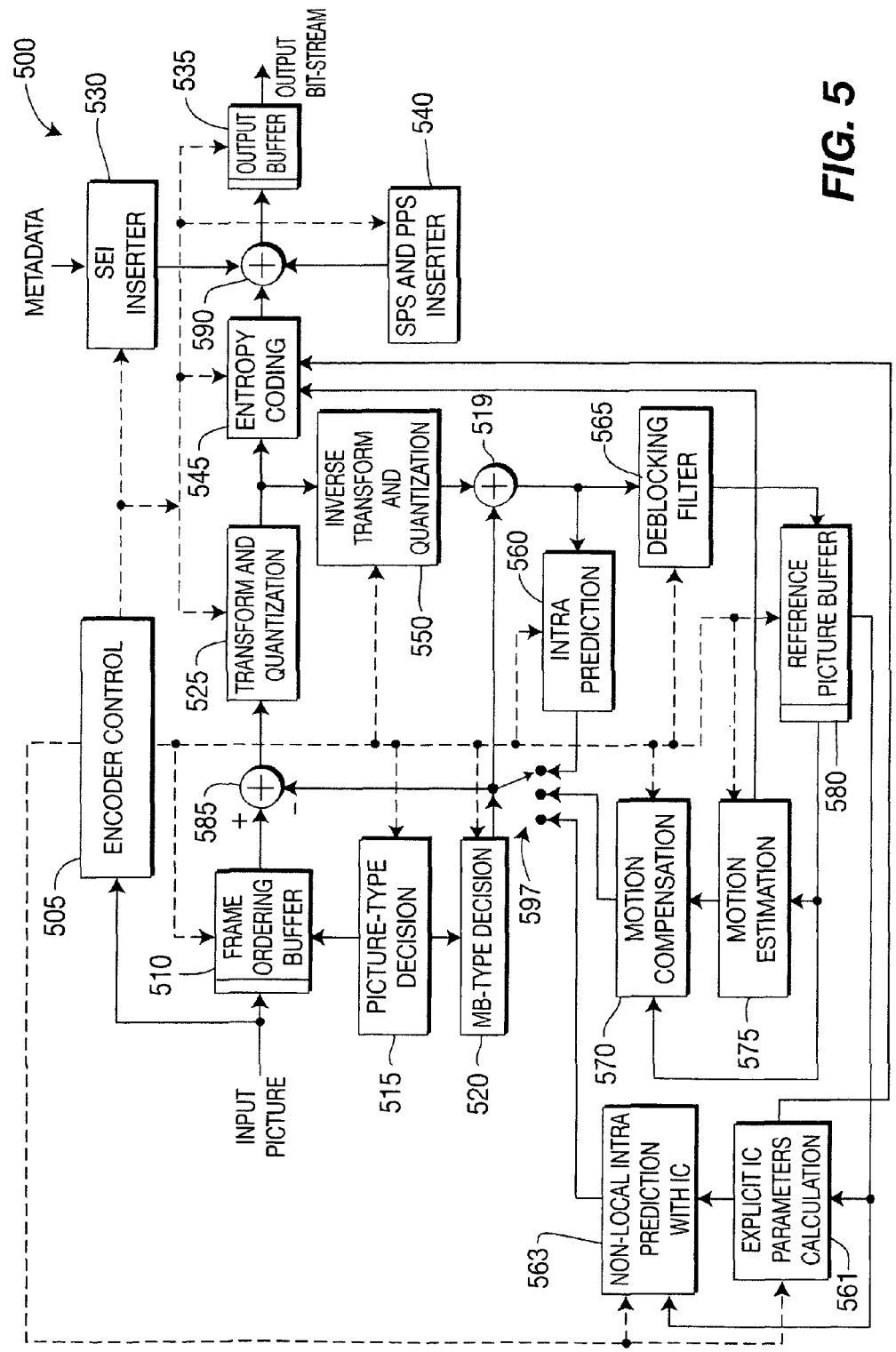
FIG. 5

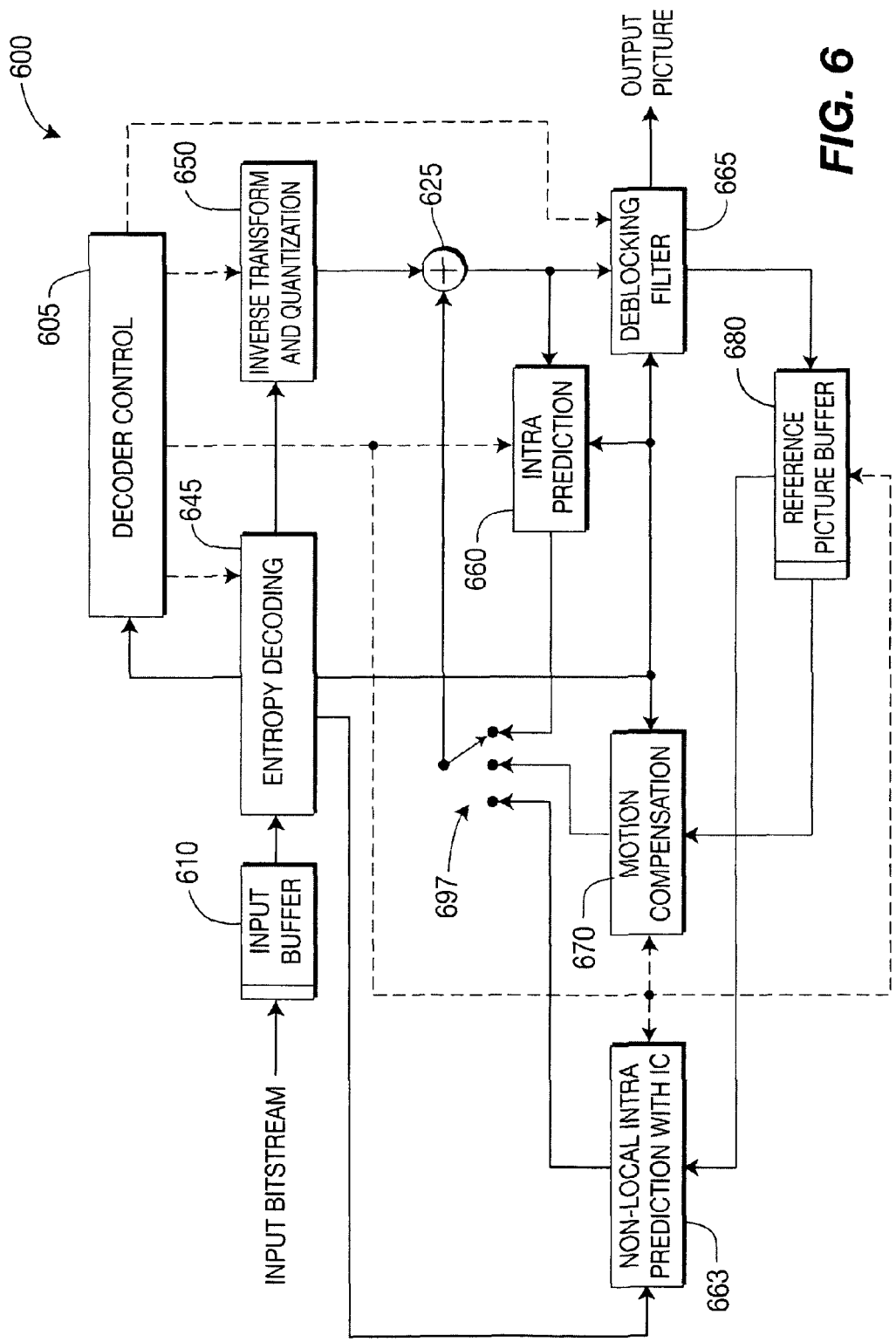
FIG. 6

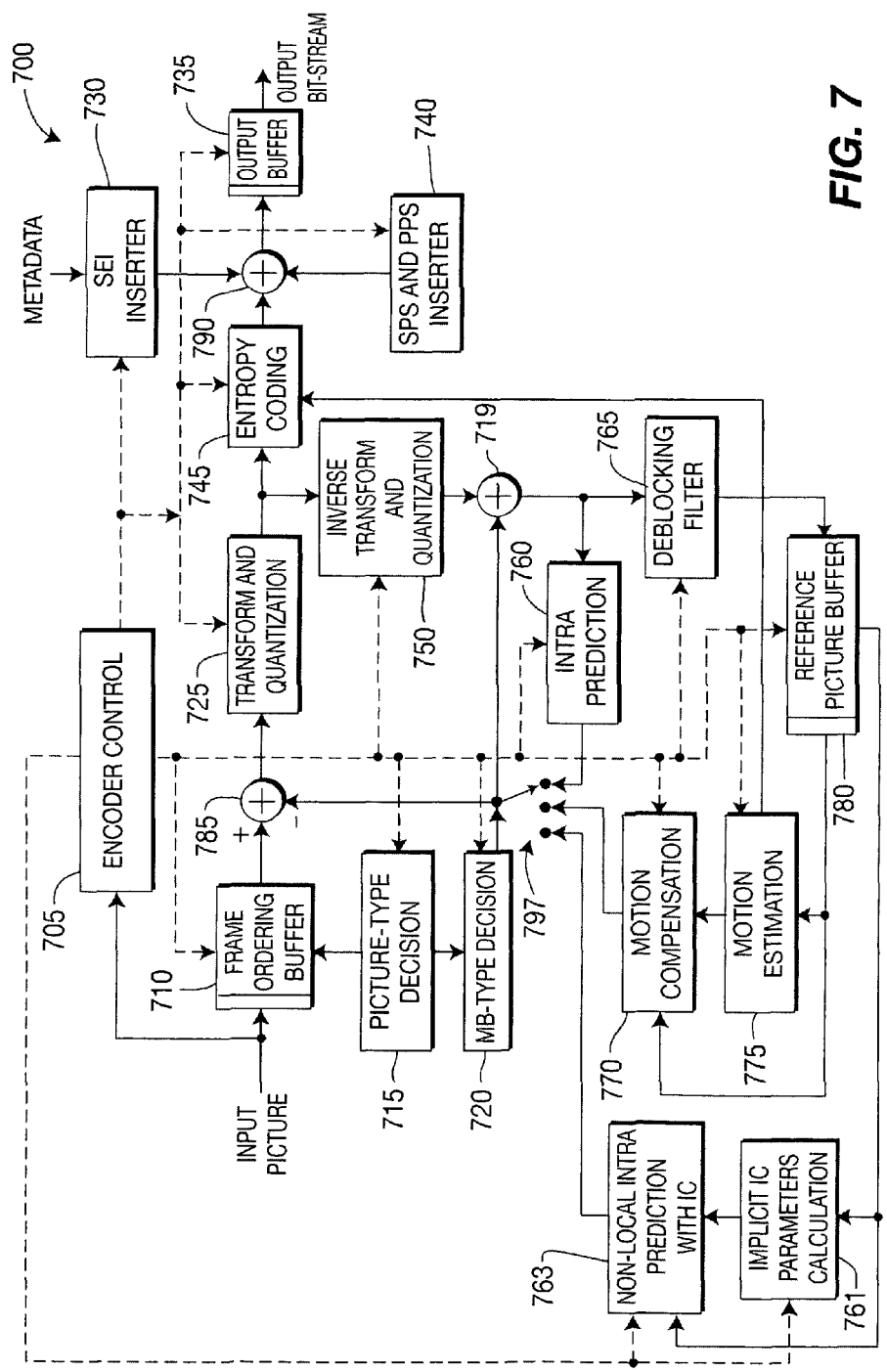
FIG. 7

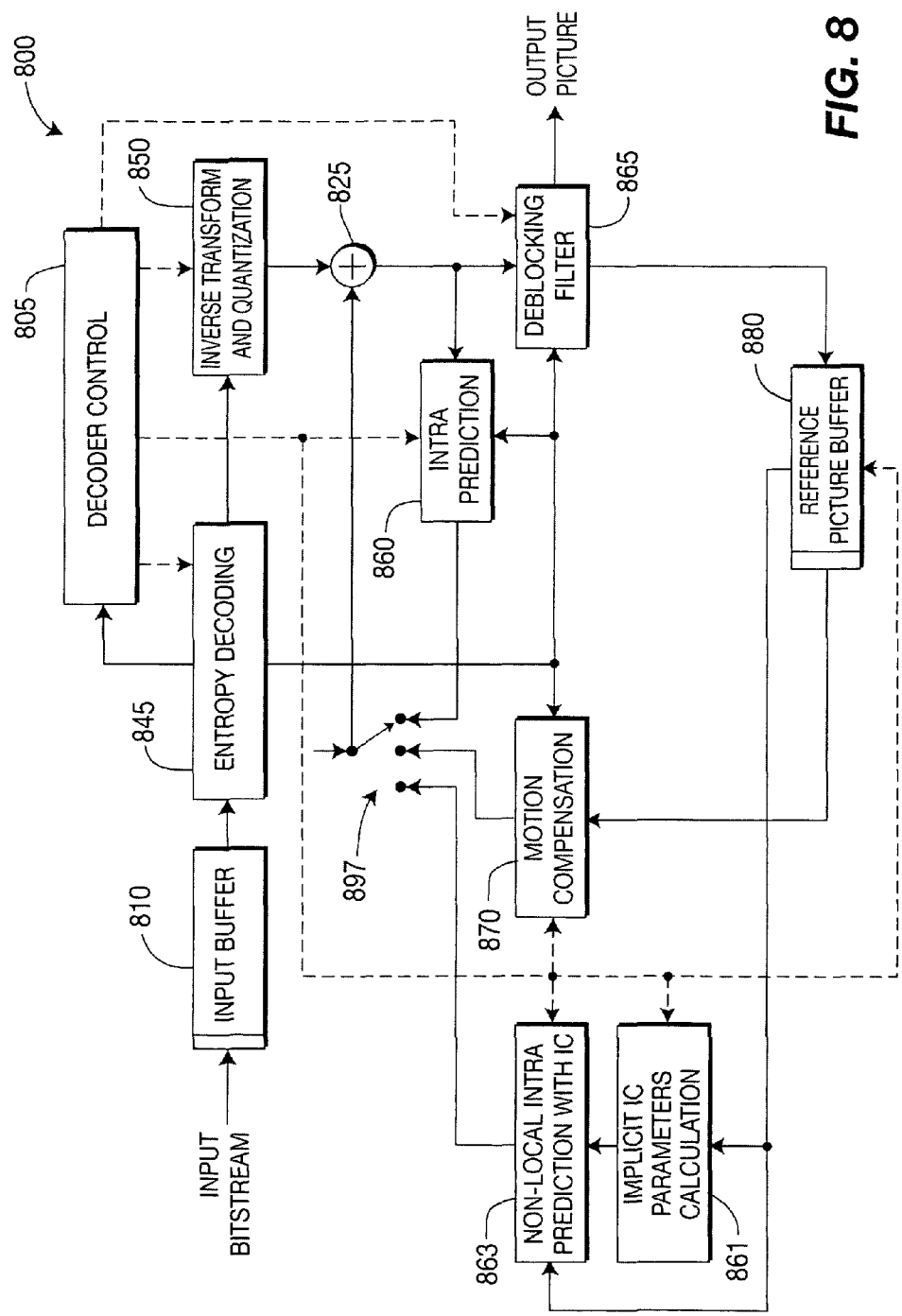
FIG. 8

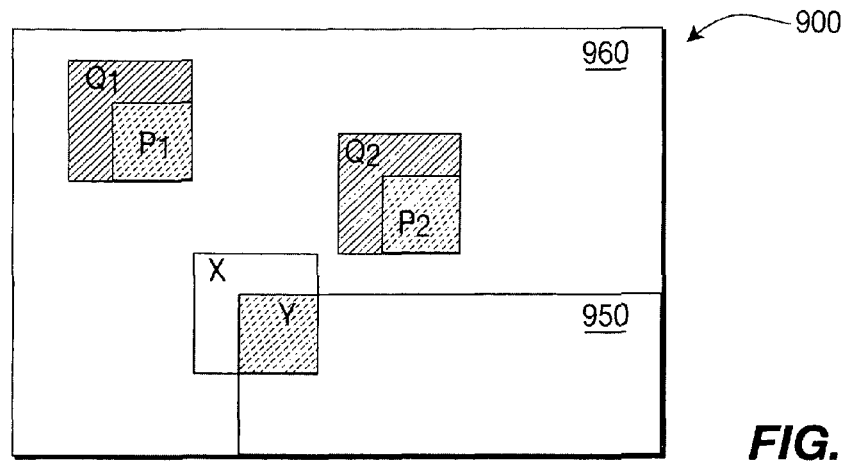
FIG. 9
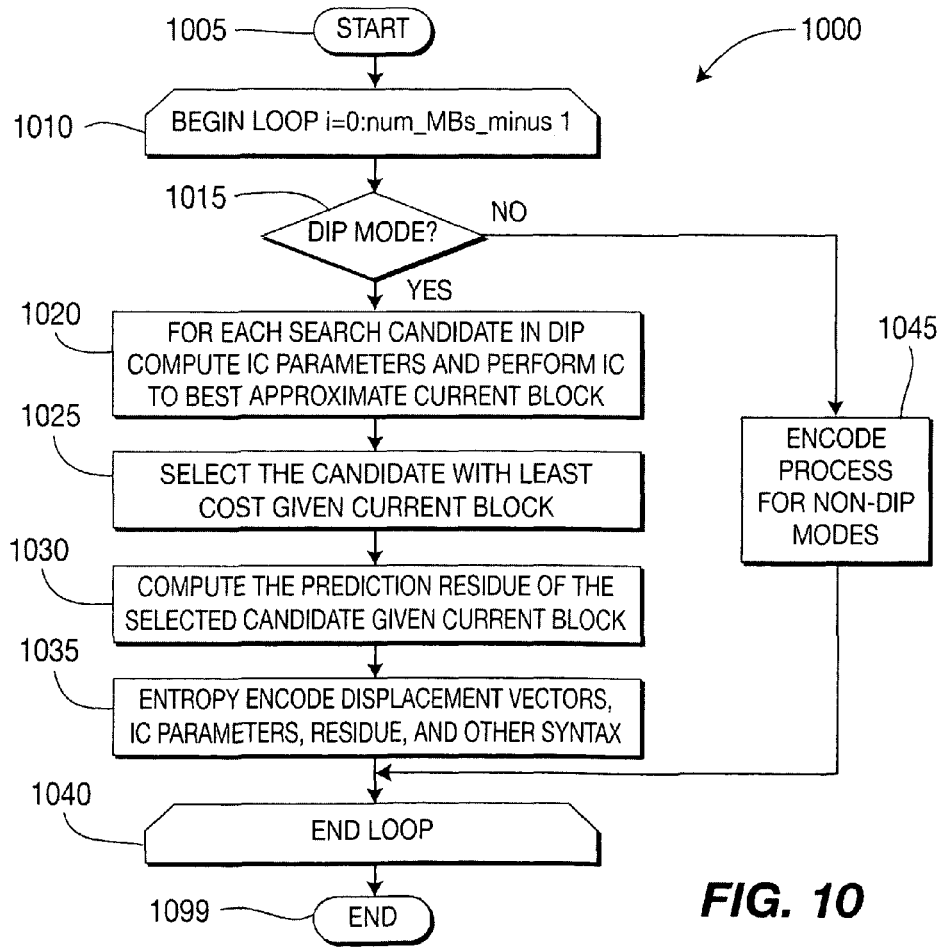
FIG. 10

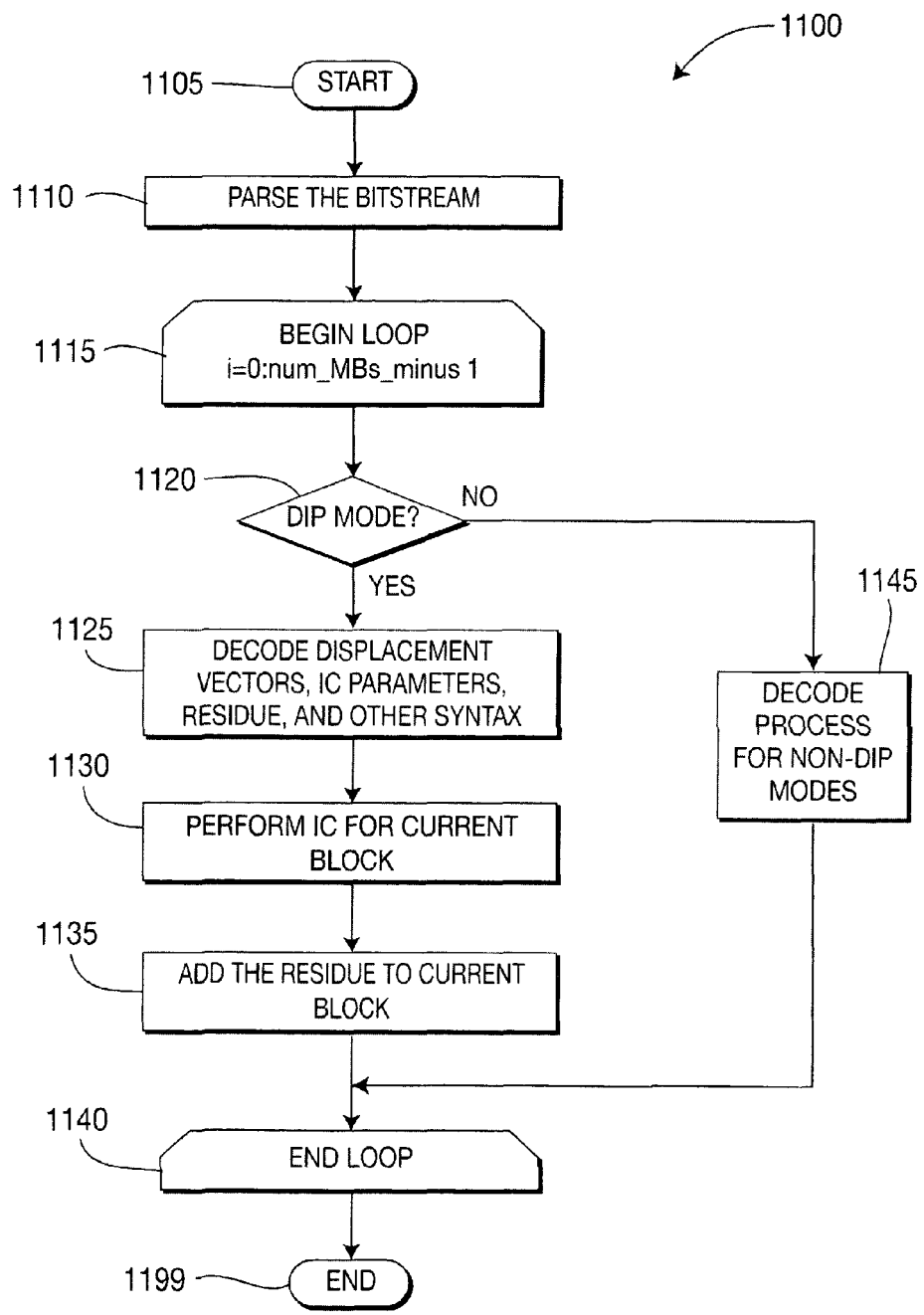
*FIG. 11*

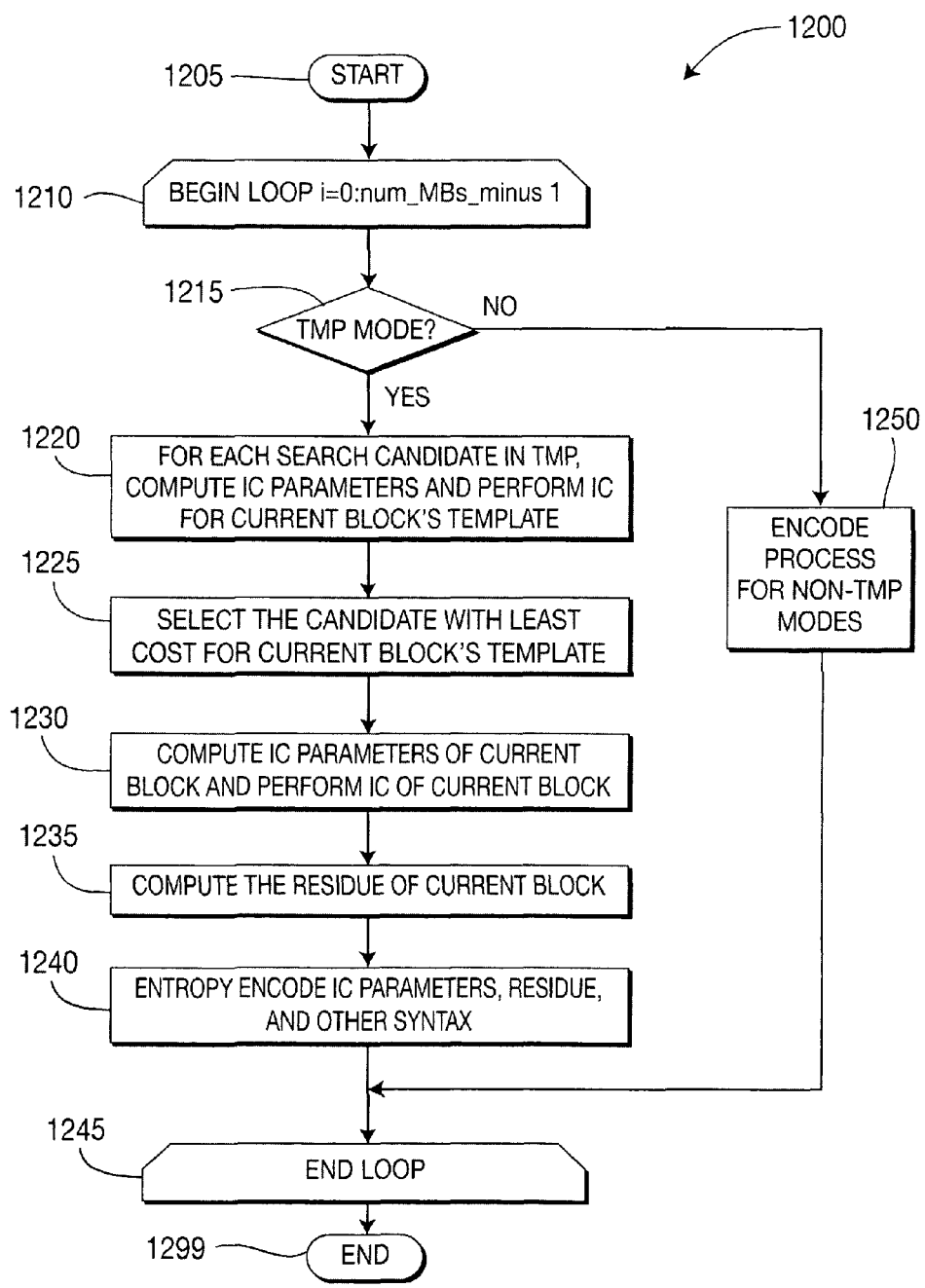
FIG. 12

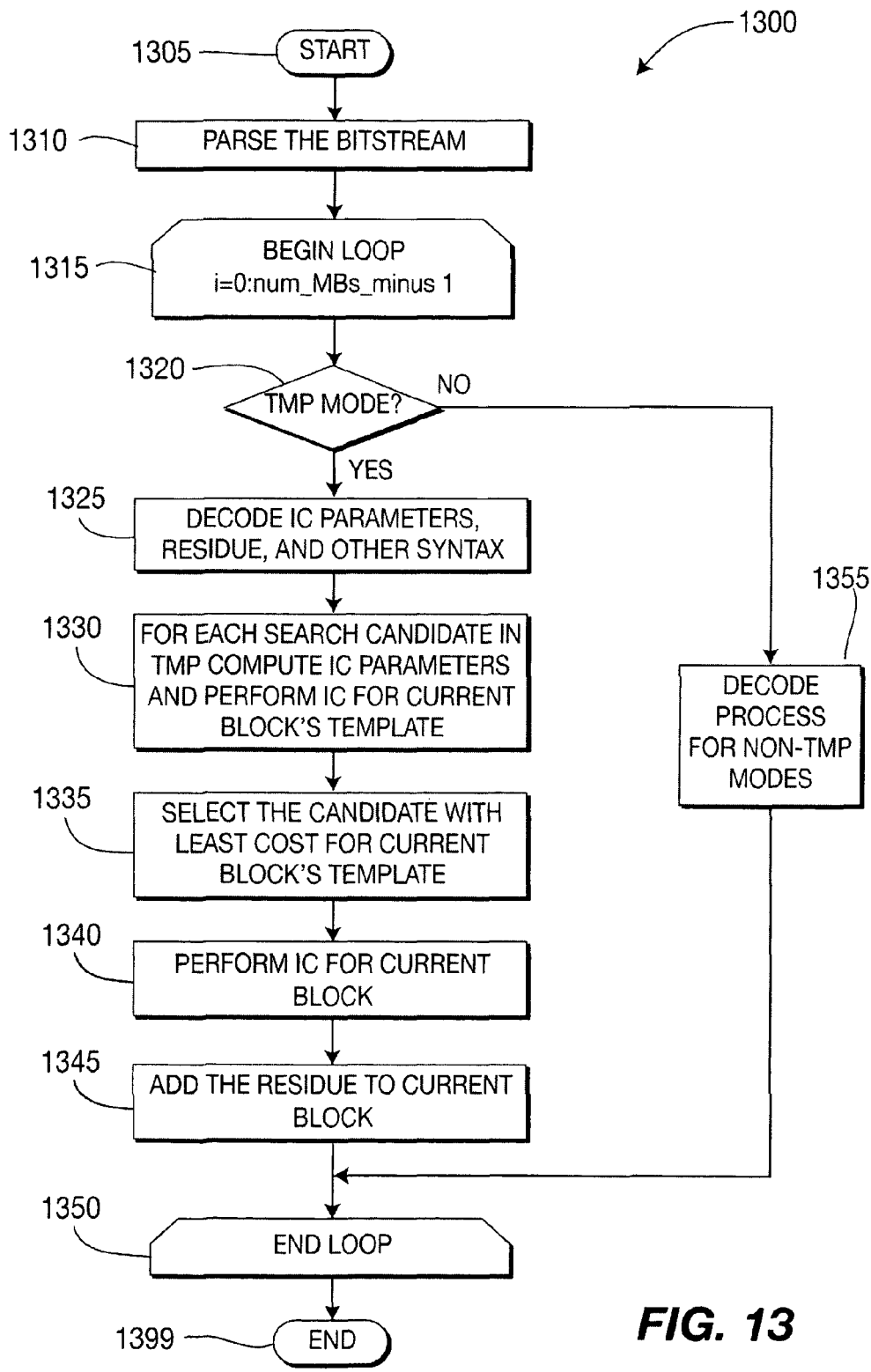
FIG. 13

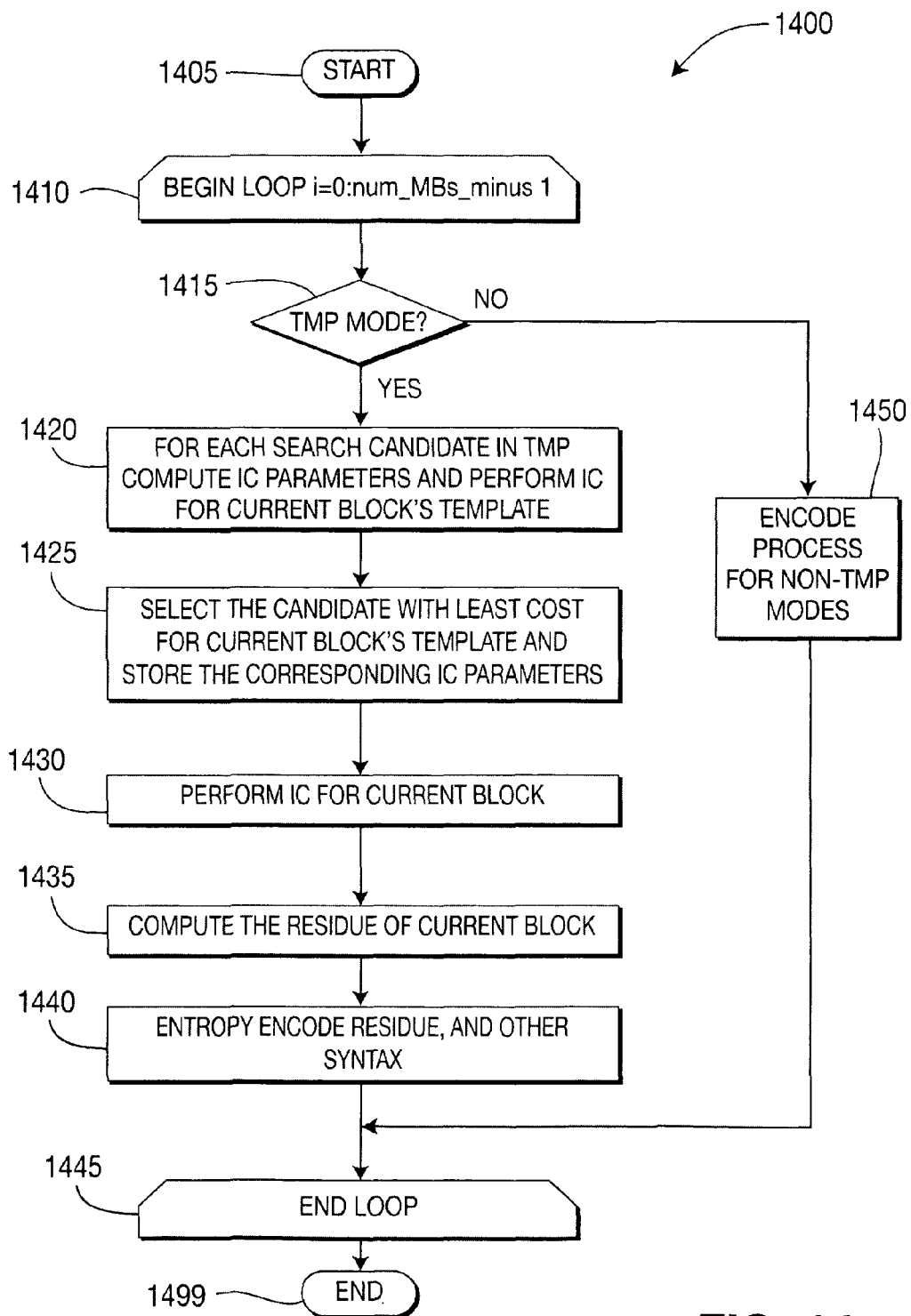
FIG. 14

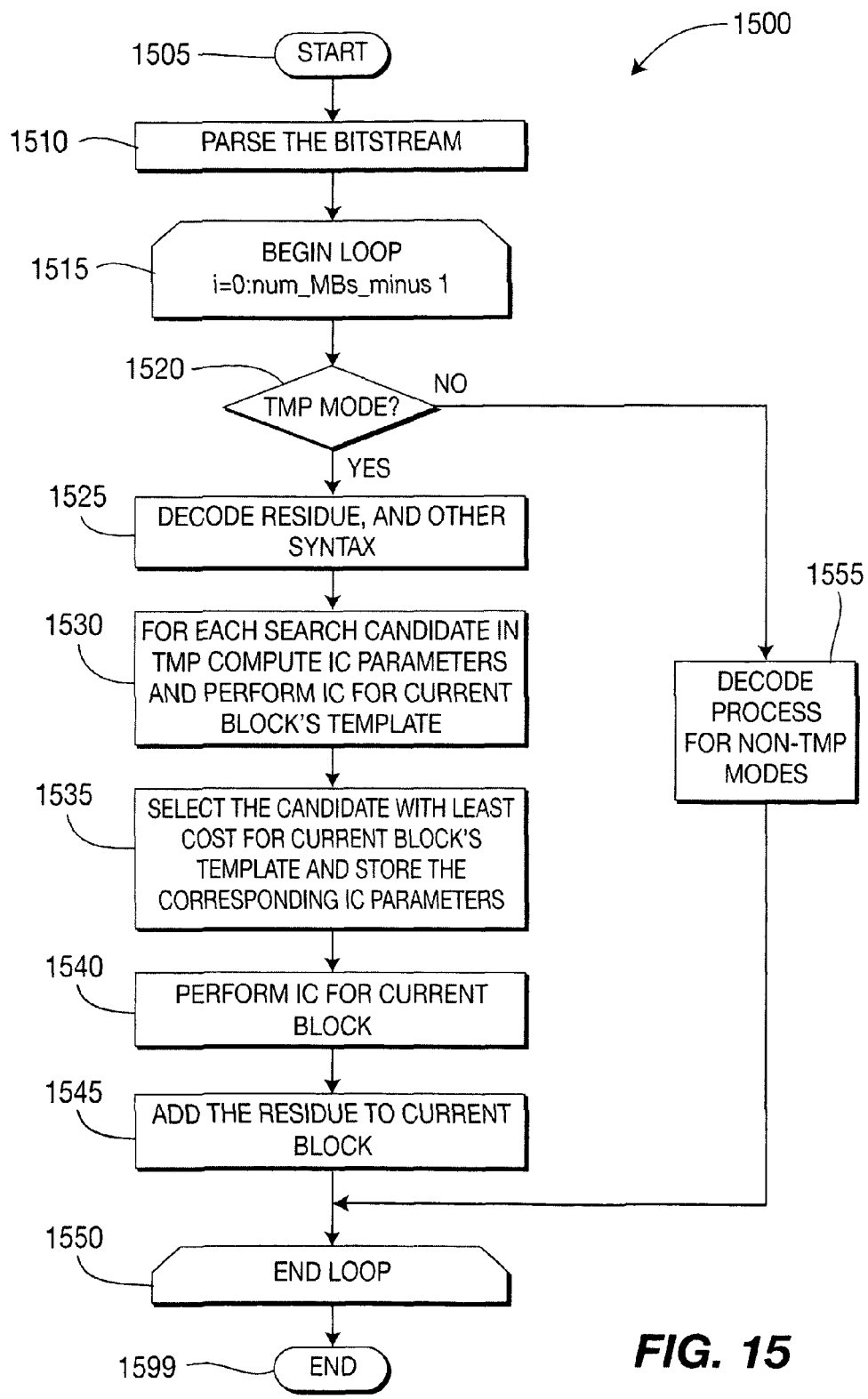
FIG. 15

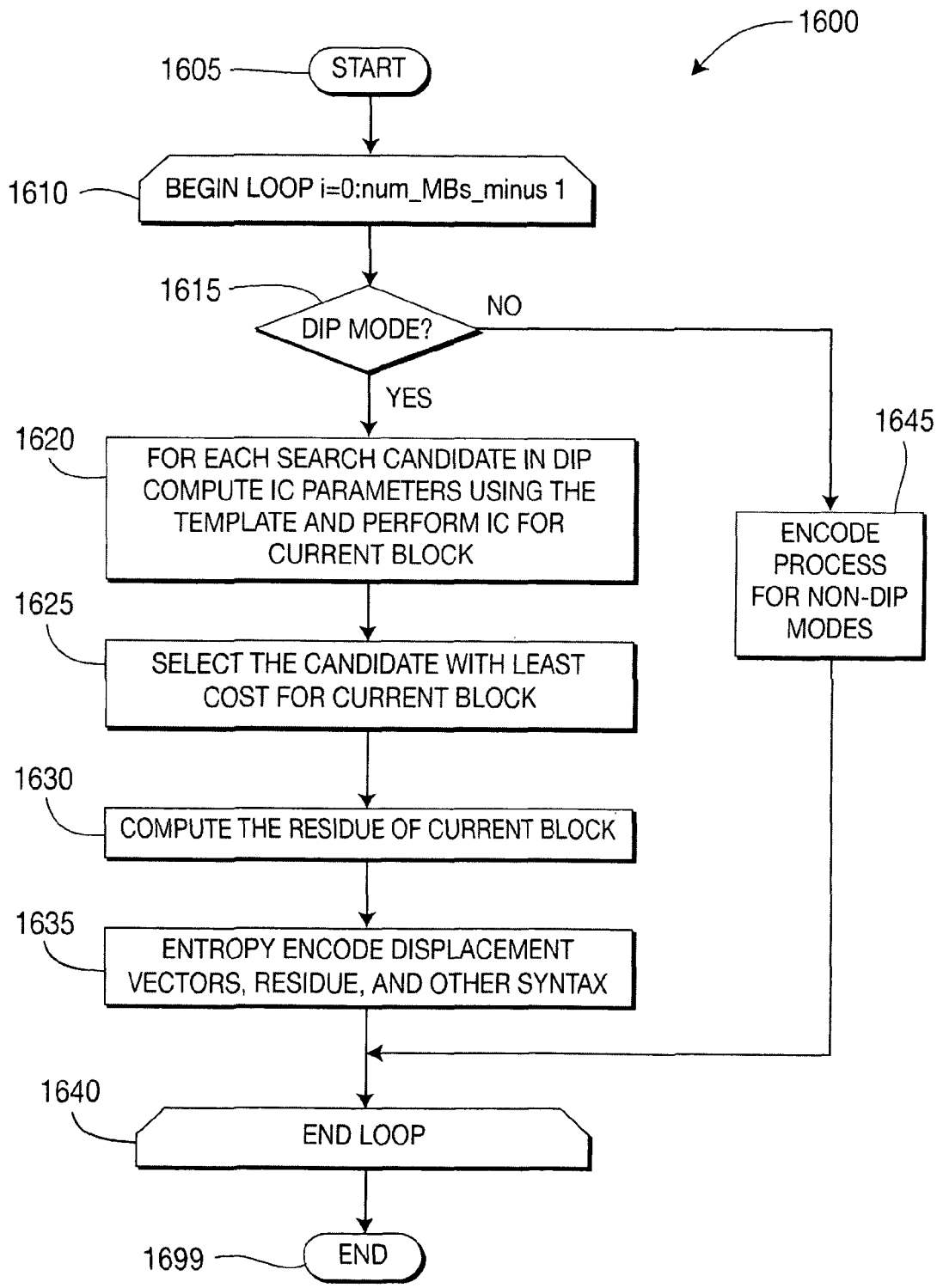
FIG. 16

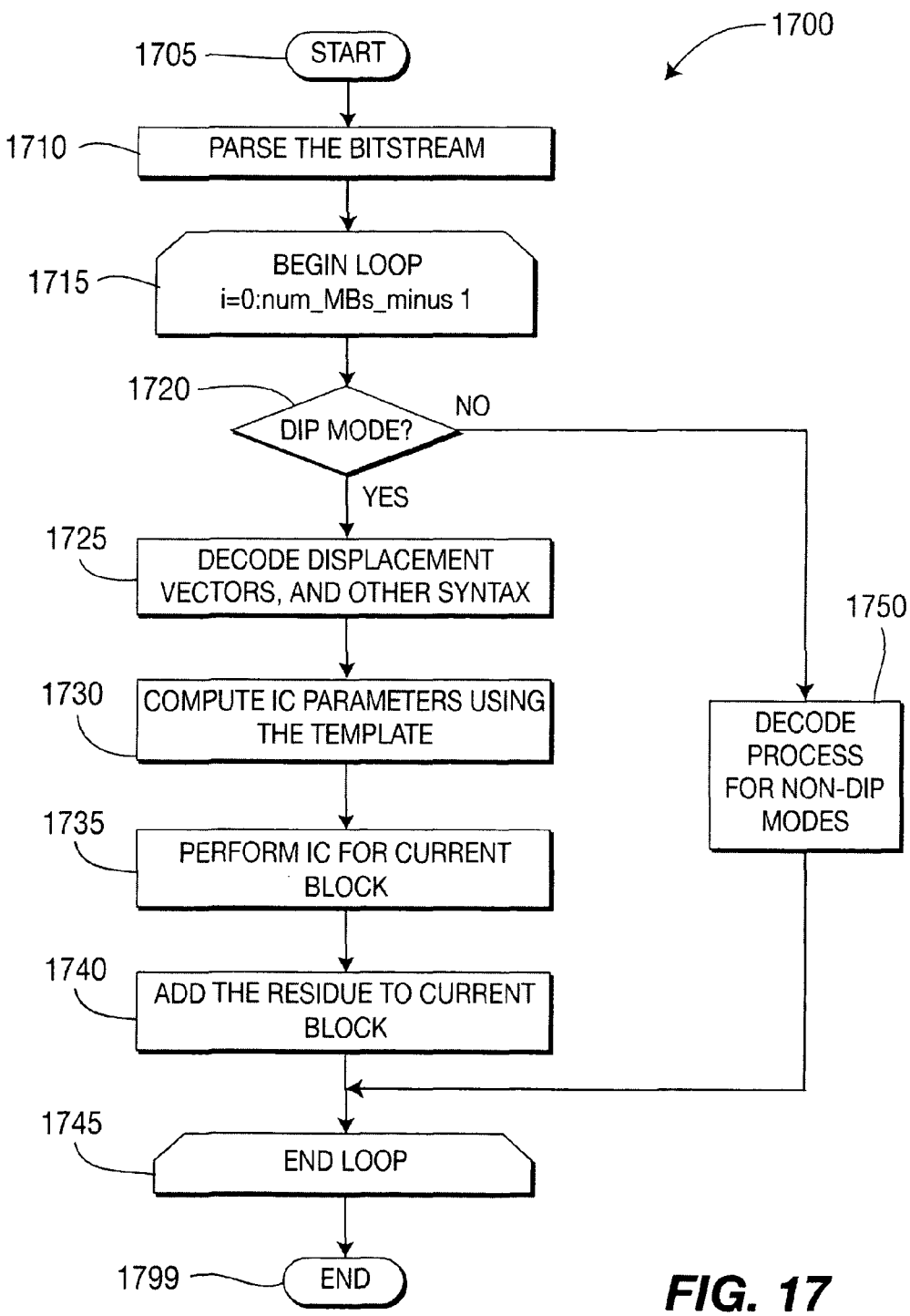
FIG. 17

United States Patent US 9,008,174 B2

METHODS AND APPARATUS FOR ILLUMINATION COMPENSATION OF INTRA-PREDICTED VIDEO

CROSS-REFERENCE TO RELATED APPLICATIONS

This application is a National Stage Application and claims the benefit, under 35 U.S.C. §365 of International Application PCT/US2000/000110 filed Jan. 9, 2009, which was published in accordance with PCT Article 21(2) on Jul. 16, 2009 in English, and which claims the benefit of U.S. Provisional Patent Application No. 61/020,228 filed on Jan. 10, 2008.

TECHNICAL FIELD

The present principles relate generally to video encoding and decoding and, more particularly, to methods and apparatus for illumination compensation of intra-predicted video.

BACKGROUND

Various prediction methods have been proposed to improve intra prediction. Recently, some non-local approaches to intra prediction have been introduced, such as displaced intra prediction (DIP) and template matching prediction (TMP), which achieve relatively acceptable coding efficiency. Non-local picture data prediction techniques account for those capable of modeling/predicting current data as a function of decoded data already available at the decoder from other regions of the picture being encoded. A similarity between the displaced intra prediction and template matching prediction approaches is that they both search the previously encoded intra regions of the current picture being coded (i.e., they use the current picture as a reference) and find the best prediction according to some coding cost, by performing, for example, region matching and/or auto-regressive template matching. A difference between the displaced intra prediction and template matching prediction approaches is that displaced intra prediction is a forward prediction approach where a displacement vector is explicitly coded in the bitstream, while template matching prediction is a backward prediction approach where a template is used to infer the displacement vector. One problem of such approaches is that by directly measuring the intensity difference as similarity criteria, they cannot handle the mismatch brought by the non-uniform illumination within the picture. The illumination variation can be caused by non-uniform lighting, object geometry change or even material characteristic variation, which is often encountered in natural video sequences. Indeed, two structurally similar picture patches may have significantly different brightness properties due to illumination variation. Non-local prediction approaches cannot always model changes in picture features like contrast and brightness using non-local information. In the presence of non-uniform illumination effects, one can use non-local data as an incomplete information set which on its own is insufficient to efficiently represent the signal to be predicted. In this case, even if exactly the same structural signal pattern is found in the already decoded picture data, the mismatch between the prediction and original signal will generate an important amount of residue that may require a significant amount of bits to code.

MPEG-4 AVC Standard Intra Prediction

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard") is the first video coding standard which employs spatial directional prediction for intra coding. The MPEG-4 AVC Standard provides a more flexible prediction framework, thus providing more coding efficiency over previous standards where intra prediction was done in the transform domain. In the MPEG-4 AVC Standard, spatial intra prediction is formed using surrounding available samples, which are previously reconstructed samples available at the decoder within the same slice. For luma samples, intra prediction can be performed on a 4×4 block basis (denoted as Intra_4×4), an 8×8 block basis (denoted as Intra_8×8), and a 16×16 macroblock basis (denoted as Intra_16×16). Turning to FIG. 1A, MPEG-4 AVC Standard directional intra prediction with respect to a 4×4 block basis (Intra_4×4) is indicated generally by the reference numeral 100. Prediction directions are generally indicated by the reference numeral 110, image blocks are generally indicated by the reference numeral 120, and a current block is indicated by the reference numeral 130. In addition to luma prediction, a separate chroma prediction is conducted. There are a total of nine prediction modes for Intra_4×4 and lntra_8×8, four modes. for Intra_16×16, and four modes for the chroma component. The encoder typically selects the prediction mode that minimizes the cost for coding the current block. A further intra coding mode, I_PCM, allows the encoder to simply bypass the prediction and transform coding processes. I_PCM allows the encoder to precisely represent the values of the samples and place an absolute limit on the number of bits that may be included in a coded macroblock without constraining the decoded image quality.

Turning to FIG. 2, labeling of prediction samples for the Intra_4×4 mode of the MPEG-4 AVC Standard is indicated generally by the reference numeral 200. FIG. 2 shows the samples (in capital letters A-M) above and to the left of the current blocks which have been previously coded and reconstructed and are therefore available at the encoder and decoder to form the prediction.

Turning to FIGS. 3B-J, Intra_4×4 luma prediction modes of the MPEG-4 AVC Standard are indicated generally by the reference numeral 300. The samples a, b, c, p of the prediction block are calculated based on the samples A-M using the Intra_4×4 luma prediction modes 300. The arrows in FIGS. 3B-J indicate the direction of prediction for each of the Intra_4×4 modes 300. The Intra_4×4 luma prediction modes 300 include modes 0-8, with mode 0 (FIG. 3B, indicated by reference numeral 310) corresponding to a vertical prediction mode, mode 1 (FIG. 3C, indicated by reference numeral 311) corresponding to a horizontal prediction mode, mode 2 (FIG. 3D, indicated by reference numeral 312) corresponding to a DC mode, mode 3 (FIG. 3E, indicated by reference numeral 313) corresponding to a diagonal down-left mode, mode 4 (FIG. 3F, indicated by reference numeral 314) corresponding to a diagonal down-right mode, mode 5 (FIG. 3G, indicated by reference numeral 315) corresponding to a vertical-right mode, mode 6 (FIG. 3H, indicated by reference numeral 316) corresponding to a horizontal-down mode, mode 7 (FIG. 3I, indicated by reference numeral 317) corresponding to a vertical-left mode, and mode 8 (FIG. 3J, indicated by reference numeral 318) corresponding to a horizontal-up mode. FIG. 3A shows the general prediction directions 330 corresponding to each of the Intra_4×4 modes 300.

In modes 3-8, the predicted samples are formed from a weighted average of the prediction samples A-M. Intra_8×8 uses basically the same concepts as 4×4 prediction, but with a prediction block size of 8×8 and with low-pass filtering of the predictors to improve prediction performance. Turning to FIGS. 4A-D, four Intra_16×16 modes corresponding to the MPEG-4 AVC Standard are indicated generally by the reference numeral 400. The four Intra_16×16 modes 400 includes modes 0-3, with mode 0 (FIG. 4A, indicated by reference numeral 411) corresponding to a vertical prediction mode, mode 1 (FIG. 4B, indicated by reference numeral 412) corresponding to a horizontal prediction mode, mode 2 (FIG. 4C, indicated by reference numeral 413) corresponding to a DC prediction mode, and mode 3 (FIG. 4D, indicated by reference numeral 414) corresponding to a plane prediction mode. Each 8×8 chroma component of an intra coded macroblock is predicted from previously encoded chroma samples above and/or to the left and both chroma components use the same prediction mode. The four prediction modes are very similar to the Intra_16×16, except that the numbering of the modes is different. The modes are DC (mode 0), horizontal (mode 1), vertical (mode 2) and plane (mode 3).

Even though intra prediction in the MPEG-4 AVC Standard improves video coding efficiency, it is still not optimal in exploiting the geometry redundancy existing along edges, contours and oriented textures and it is not efficient in coding texture.

Displaced Intra Prediction (DIP)

During the development of the ITU-T H.26L Standard, displaced intra prediction was proposed. The proposal re-uses the concept of variable block size inter-prediction as specified in the MPEG-4 AVC Standard for intra prediction. Turning to FIG. 1B, an example of displaced intra prediction is indicated generally by the reference numeral 150. The displaced intra prediction 150 involves an intra coded region 152, a current block 154, and a candidate block 156. In general, previously encoded intra regions (e.g., intra coded region 152) of a slice can be referenced by displacement vectors (e.g., displacement vector 156) for prediction of the current intra block (e.g., current block 154). The displaced intra prediction 150 is implemented on a macroblock basis. The displacement vectors are encoded differentially using a prediction by the median of the neighboring blocks, in analogy to the inter motion vectors in the MPEG-4 AVC Standard.

Even though displace intra prediction effectively improves coding efficiency when textures or patterns are repeated in intra coded pictures, displace intra prediction is limited by the fact that structurally similar regions may have different illumination properties within the same picture.

Template Matching Prediction (TMP)

Template matching prediction is a concept of texture synthesis to deal with the generation of a continuous texture that resembles a given sample.

Intra prediction using template matching in the context of the MPEG-4 AVC Standard has been proposed. In the proposal, the scheme is integrated as an additional mode for Intra4×4 or Intra8×8 prediction in the MPEG-4 AVC Standard. With template matching prediction, self-similarities of image regions are exploited for prediction. Previously encoded intra regions of a slice can be reused for prediction. The TMP algorithm recursively determines the value of current pixels under prediction by selecting at least one patch (of one or more pixels) of decoded data. Patches are selected according to a matching rule, where patch neighboring pixels are compared to current block neighboring pixels, and patches having the most similar neighboring pixels are selected. Turning to FIG. 1C, an example of template matching intra prediction is indicated generally by the reference numeral 170. The template matching intra prediction 170 involves a candidate neighborhood 172, a candidate patch 174, a template 176, and a target 178. Since the search region and the neighborhood (e.g., candidate neighborhood 172) of the current pixels (e.g., target 178) are known at the encoder and the decoder side, no additional side information has to be transmitted, and identical prediction is achieved on both sides. Here, template matching on a 2×2 luma sample grid is applied to enable a joint prediction for luma and chroma samples in 4:2:0 video sequences.

Displaced intra prediction and template matching prediction both search the previously encoded regions in a current picture. Those encoded regions may not have the same illumination characteristics as the block to be coded, which can degrade the coding performance.

Weighted Prediction for Inter-Prediction

Weighted prediction was proposed to handle temporal illumination variation or fade in/out effects for motion compensation. However, weighted prediction has not been proposed for intra prediction to handle illumination variation inside a picture.

SUMMARY

These and other drawbacks and disadvantages of the prior art are addressed by the present principles, which are directed to methods and apparatus for illumination compensation of intra-predicted video.

According to an aspect of the present principles, there is provided an apparatus. The apparatus includes an encoder for encoding a picture using non-local intra prediction. The encoder includes an illumination compensation processing unit (an illumination compensation portion) for applying illumination compensation to predicted data obtained from the non-local intra prediction.

According to another aspect of the present principles, there is provided a method. The method includes encoding a picture using non-local intra prediction. The encoding step includes applying illumination compensation to predicted data obtained from the non-local intra prediction.

According to yet another aspect of the present principles, there is provided an apparatus. The apparatus includes a decoder for decoding a picture using non-local intra prediction. The decoder includes an illumination compensation processing unit (an illumination compensation portion) for applying illumination compensation to predicted data obtained from the non-local intra prediction.

According to still another aspect of the present principles, there is provided a method. The method includes decoding a picture using non-local intra prediction. The decoding step includes applying illumination compensation to predicted data obtained from the non-local intra prediction.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 1A is a diagram showing MPEG-4 AVC Standard directional intra prediction with respect to a 4×4 block basis (Intra_4×4);

FIG. 1B is a diagram showing an example of displaced intra prediction;

FIG. 1C is a diagram showing an example of template matching intra prediction;

FIG. 2 is a diagram showing labeling of prediction samples for the Intra_4×4 mode of the MPEG-4 AVC Standard;

FIGS. 3A-J are diagrams showing Intra_4×4 luma prediction modes of the MPEG-4 AVC Standard;

FIGS. 4A-D are diagrams respectively showing four Intra_16×16 modes corresponding to the MPEG—4 AVC Standard;

FIG. 5 is a block diagram showing an exemplary encoder for encoding picture data using explicit illumination compensation, in accordance with an embodiment of the present principles;

FIG. 6 is a block diagram showing an exemplary decoder for decoding picture data using explicit illumination compensation, in accordance with an embodiment of the present principles;

FIG. 7 is a block diagram showing an exemplary encoder for encoding picture data using implicit illumination compensation, in accordance with an embodiment of the present principles;

FIG. 8 is a block diagram showing an exemplary decoder for decoding picture data using implicit illumination compensation, in accordance with an embodiment of the present principles;

FIG. 9 is a diagram showing an example of non-local intra prediction, in accordance with an embodiment of the present principles;

FIG. 10 is a flow diagram showing an exemplary method for encoding picture data using displaced intra prediction (DIP) and explicit illumination compensation, in accordance with an embodiment of the present principles;

FIG. 11 is a flow diagram showing an exemplary method for decoding picture data using displaced intra prediction (DIP) and explicit illumination compensation, in accordance with an embodiment of the present principles;

FIG. 12 is a flow diagram showing an exemplary method for encoding picture data using template matching prediction (TMP) and explicit illumination compensation, in accordance with an embodiment of the present principles;

FIG. 13 is a flow diagram showing an exemplary method for decoding picture data using template matching prediction (TMP) and explicit illumination compensation, in accordance with an embodiment of the present principles;

FIG. 14 is a flow diagram showing an exemplary method for encoding picture data using displaced intra prediction (DIP) and implicit illumination compensation, in accordance with an embodiment of the present principles;

FIG. 15 is a flow diagram showing an exemplary method for decoding picture data using displaced intra prediction (DIP) and implicit illumination compensation, in accordance with an embodiment of the present principles;

FIG. 16 is a flow diagram showing an exemplary method for encoding picture data using template matching prediction (TMP) and implicit illumination compensation, in accordance with an embodiment of the present principles; and FIG. 17 is a flow diagram showing an exemplary method for decoding picture data using template matching prediction (TMP) and implicit illumination compensation, in accordance with an embodiment of the present principles;

DETAILED DESCRIPTION

The present principles are directed to methods and apparatus for illumination compensation of intra-predicted video.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, it is to be appreciated that while one or more embodiments of the present principles are described herein with respect to the luma Y component, the present principles are not limited to solely this component and, thus, may be utilized with respect to other components (of, e.g., a picture, an image, and/or video data), while maintaining the spirit of the present principles. For example, the present principles may be applied to RGB color components, chroma components, view depth components, and so forth.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Turning to FIG. 5, an exemplary encoder for encoding picture data using explicit illumination compensation is indicated generally by the reference numeral 500.

The encoder 500 includes a frame ordering buffer 510 having an output in signal communication with a non-inverting input of a combiner 585. An output of the combiner 585 is connected in signal communication with a first input of a transformer and quantizer 525. An output of the transformer and quantizer 525 is connected in signal communication with a first input of an entropy coder 545 and a first input of an inverse transformer and inverse quantizer 550. An output of the entropy coder 545 is connected in signal communication with a first non-inverting input of a combiner 590. An output of the combiner 590 is connected in signal communication with a first input of an output buffer 535.

A first output of an encoder controller 505 is connected in signal communication with a second input of the frame ordering buffer 510, a second input of the inverse transformer and inverse quantizer 550, an input of a picture-type decision module 515, a first input of a macroblock-type (MB-type) decision module 520, a second input of an intra prediction module 560, a second input of a deblocking filter 565, a first input of a motion compensator 570, a first input of a motion estimator 575, and a second input of a reference picture buffer 580.

A second output of the encoder controller 505 is connected in signal communication with a first input of a Supplemental Enhancement Information (SEI) inserter 530, a second input of the transformer and quantizer 525, a second input of the entropy coder 545, a second input of the output buffer 535, and an input of the Sequence Parameter Set (SPS) and Picture Parameter Set (PPS) inserter 540.

An output of the SEI inserter 530 is connected in signal communication with a second non-inverting input of the combiner 590.

A first output of the picture-type decision module 515 is connected in signal communication with a third input of a frame ordering buffer 510. A second output of the picture-type decision module 515 is connected in signal communication with a second input of a macroblock-type decision module 520.

An output of the Sequence Parameter Set (SPS) and Picture Parameter Set (PPS) inserter 540 is connected in signal communication with a third non-inverting input of the combiner 590.

An output of the inverse quantizer and inverse transformer 550 is connected in signal communication with a first non-inverting input of a combiner 519. An output of the combiner 519 is connected in signal communication with a first input of the intra prediction module 560 and a first input of the deblocking filter 565. An output of the deblocking filter 565 is connected in signal communication with a first input of a reference picture buffer 580. A first output of the reference picture buffer 580 is connected in signal communication with a second input of the motion estimator 575 and with a third input of the motion compensator 570. A first output of the motion estimator 575 is connected in signal communication with a second input of the motion compensator 570. A second output of the motion estimator 575 is connected in signal communication with a third input of the entropy coder 545.

An output of the motion compensator 570 is connected in signal communication with a first input of a switch 597. An output of the intra prediction module 560 is connected in signal communication with a second input of the switch 597. An output of the macroblock-type decision module 520 is connected in signal communication with a fourth input of the switch 597. The fourth input of the switch 597 determines whether or not the "data" input of the switch (as compared to the control input, i.e., the fourth input) is to be provided by the motion compensator 570 or the intra prediction module 560. The output of the switch 597 is connected in signal communication with a second non-inverting input of the combiner 519 and with an inverting input of the combiner 585.

A second output of the reference picture buffer 580 is connected in signal communication with a first input of an explicit illumination compensation parameters calculator 561 and a first input of a non-local intra predictor with illumination compensation 563. A third output of the encoder controller 505 is connected in signal communication with a second input of the explicit illumination compensation parameters calculator 561 and a second input of the non-local intra predictor with illumination compensation 563. A first output of the explicit illumination compensation parameters calculator 561 is connected in signal communication with a third input of the non-local intra predictor with illumination compensation 563. A second output of the explicit illumination compensation parameters calculator 561 is connected in signal communication with a fourth input of the entropy coder 545. An output of the non-local intra predictor with illumination compensation 563 is connected in signal communication with a third input of the switch 597.

A first input of the frame ordering buffer 510 and an input of the encoder controller 505 are available as input of the encoder 500, for receiving an input picture. Moreover, a second input of the Supplemental Enhancement Information (SEI) inserter 530 is available as an input of the encoder 500, for receiving metadata. An output of the output buffer 535 is available as an output of the encoder 500, for outputting a bitstream.

Tuning to FIG. 6, an exemplary decoder for decoding picture data using explicit illumination compensation is indicated generally by the reference numeral 600.

The video decoder 600 includes an input buffer 610 having an output connected in signal communication with a first input of the entropy decoder 645. A first output of the entropy decoder 645 is connected in signal communication with a first input of an inverse transformer and inverse quantizer 650. An output of the inverse transformer and inverse quantizer 650 is connected in signal communication with a second non-inverting input of a combiner 625. An output of the combiner 625 is connected in signal communication with a second input of a deblocking filter 665 and a first input of an intra prediction module 660. A second output of the deblocking filter 665 is connected in signal communication with a first input of a reference picture buffer 680. A first output of the reference picture buffer 680 is connected in signal communication with a second input of a motion compensator 670.

A second output of the entropy decoder 645 is connected in signal communication with a third input of the motion compensator 670 and a first input of the deblocking filter 665. A third output of the entropy decoder 645 is connected in signal communication with an input of a decoder controller 605. A first output of the decoder controller 605 is connected in signal communication with a second input of the entropy decoder 645. A second output of the decoder controller 605 is connected in signal communication with a second input of the inverse transformer and inverse quantizer 650. A third output of the decoder controller 605 is connected in signal communication with a third input of the deblocking filter 665. A fourth output of the decoder controller 605 is connected in signal communication with a second input of the intra prediction module 660, with a first input of the motion compensator 670, with a third input of a non-local intra predictor with illumination compensation 663, and with a second input of the reference picture buffer 680.

A first output of the motion compensator 670 is connected in signal communication with a first input of a switch 697. An output of the intra prediction module 660 is connected in signal communication with a second input of the switch 697. An output of the switch 697 is connected in signal communication with a first non-inverting input of the combiner 625.

A fourth output of the entropy decoder 645 is connected in signal communication with a first input of a non-local intra predictor with illumination compensation 663. A second output of the reference picture buffer 680 is connected in signal communication with a second input of the non-local intra predictor with illumination compensation 663. An output of the non-local intra predictor with illumination compensation 663 is connected in signal communication with a third input of the switch 697.

An input of the input buffer 610 is available as an input of the decoder 600, for receiving an input bitstream. A first output of the deblocking filter with geometric extensions 665 is available as an output of the decoder 600, for outputting an output picture.

Turning to FIG. 7 an exemplary encoder for encoding picture data using implicit illumination compensation is indicated generally by the reference numeral 700.

The encoder 700 includes a frame ordering buffer 710 having an output in signal communication with a non-inverting input of a combiner 785. An output of the combiner 785 is connected in signal communication with a first input of a transformer and quantizer 725. An output of the transformer and quantizer 725 is connected in signal communication with a first input of an entropy coder 745 and a first input of an inverse transformer and inverse quantizer 750. An output of the entropy coder 745 is connected in signal communication with a first non-inverting input of a combiner 790. An output of the combiner 790 is connected in signal communication with a first input of an output buffer 735.

A first output of an encoder controller 705 is connected in signal communication with a second input of the frame ordering buffer 710, a second input of the inverse transformer and inverse quantizer 750, an input of a picture-type decision module 715, a first input of a macroblock-type (MB-type) decision module 720, a second input of an intra prediction module 760, a second input of a deblocking filter 765, a first input of a motion compensator 770, a first input of a motion estimator 775, and a second input of a reference picture buffer 780.

A second output of the encoder controller 705 is connected in signal communication with a first input of a Supplemental Enhancement Information (SEI) inserter 730, a second input of the transformer and quantizer 725, a second input of the entropy coder 745, a second input of the output buffer 735, and an input of the Sequence Parameter Set (SPS) and Picture Parameter Set (PPS) inserter 740.

An output of the SEI inserter 730 is connected in signal communication with a second non-inverting input of the combiner 790.

A first output of the picture-type decision module 715 is connected in signal communication with a third input of a frame ordering buffer 710. A second output of the picture-type decision module 715 is connected in signal communication with a second input of a macroblock-type decision module 720.

An output of the Sequence Parameter Set (SPS) and Picture Parameter Set (PPS) inserter 740 is connected in signal communication with a third non-inverting input of the combiner 790.

An output of the inverse quantizer and inverse transformer 750 is connected in signal communication with a first non-inverting input of a combiner 719. An output of the combiner 719 is connected in signal communication with a first input of the intra prediction module 760 and a first input of the deblocking filter 765. An output of the deblocking filter 765 is connected in signal communication with a first input of a reference picture buffer 780. A first output of the reference picture buffer 780 is connected in signal communication with a second input of the motion estimator 775 and with a third input of the motion compensator 770. A first output of the motion estimator 775 is connected in signal communication with a second input of the motion compensator 770. A second output of the motion estimator 775 is connected in signal communication with a third input of the entropy coder 745.

An output of the motion compensator 770 is connected in signal communication with a first input of a switch 797. An output of the intra prediction module 760 is connected in signal communication with a second input of the switch 797. An output of the macroblock-type decision module 720 is connected in signal communication with a fourth input of the switch 797. The fourth input of the switch 797 determines whether or not the "data" input of the switch (as compared to the control input, i.e., the fourth input) is to be provided by the motion compensator 770 or the intra prediction module 760.

The output of the switch 797 is connected in signal communication with a second non-inverting input of the combiner 719 and with an inverting input of the combiner 785.

A second output of the reference picture buffer 780 is connected in signal communication with a first input of an implicit illumination compensation parameters calculator 761 and a first input of a non-local intra predictor with illumination compensation 763. A third output of the encoder controller 705 is connected in signal communication with a second input of the implicit illumination compensation parameters calculator 761 and a second input of the non-local intra predictor with illumination compensation 763. An output of the implicit illumination compensation parameters calculator 761 is connected in signal communication with a third input of the non-local intra predictor with illumination compensation 763. An output of the non-local intra predictor with illumination compensation 763 is connected in signal communication with a third input of the switch 797.

A first input of the frame ordering buffer 710 and an input of the encoder controller 705 are available as input of the encoder 700, for receiving an input picture. Moreover, a second input of the Supplemental Enhancement Information (SEI) inserter 730 is available as an input of the encoder 700, for receiving metadata. An output of the output buffer 735 is available as an output of the encoder 700, for outputting a bitstream.

Tuning to FIG. 8 an exemplary decoder for decoding picture data using implicit illumination compensation is indicated generally by the reference numeral 800.

The video decoder 800 includes an input buffer 810 having an output connected in signal communication with a first input of the entropy decoder 845. A first output of the entropy decoder 845 is connected in signal communication with a first input of an inverse transformer and inverse quantizer 850. An output of the inverse transformer and inverse quantizer 850 is connected in signal communication with a second non-inverting input of a combiner 825. An output of the combiner 825 is connected in signal communication with a second input of a deblocking filter 865 and a first input of an intra prediction module 860. A second output of the deblocking filter 865 is connected in signal communication with a first input of a reference picture buffer 880. A first output of the reference picture buffer 880 is connected in signal communication with a second input of a motion compensator 870.

A second output of the entropy decoder 845 is connected in signal communication with a third input of the motion compensator 870 and a first input of the deblocking filter 865. A third output of the entropy decoder 845 is connected in signal communication with an input of a decoder controller 805. A first output of the decoder controller 805 is connected in signal communication with a second input of the entropy decoder 845. A second output of the decoder controller 805 is connected in signal communication with a second input of the inverse transformer and inverse quantizer 850. A third output of the decoder controller 805 is connected in signal communication with a third input of the deblocking filter 865. A fourth output of the decoder controller 805 is connected in signal communication with a second input of the intra prediction module 860, with a first input of the motion compensator 870, with a third input of a non-local intra predictor with illumination compensation 863, with a second input of the reference picture buffer 880, with a first input of an implicit illumination compensation parameters calculator 861, and with a control input (for controlling a selection between a first, a second, and a third input) of a switch 897.

A first output of the motion compensator 870 is connected in signal communication with the first input of the switch 897.

An output of the intra prediction module 860 is connected in signal communication with the second input of the switch 897. The output of the switch 897 is connected in signal communication with a first non-inverting input of the combiner 825.

A second output of the reference picture buffer 880 is connected in signal communication with a second input of the non-local intra predictor with illumination compensation 863 and with a second input of an implicit illumination compensation parameters calculator 861. An output of the non-local intra predictor with illumination compensation 863 is connected in signal communication with a third input of the non-local intra predictor with illumination compensation 863. An output of the non-local intra predictor with illumination compensation 863 is connected in signal communication with the third input of the switch 897.

An input of the input buffer 810 is available as an input of the decoder 800, for receiving an input bitstream. A first output of the deblocking filter with geometric extensions 865 is available as an output of the decoder 800, for outputting an output picture.

As noted above, the present principles are directed to methods and apparatus for illumination compensation of intra-predicted video.

In accordance with one or more embodiments, we propose an adaptive Illumination Compensation (IC) technique for intra prediction in order to model spatial variations in at least one of a picture, an image, and video data (collectively referred to herein as a "picture"). In particular, two exemplary schemes are proposed directed to how a decoder can retrieve the parameters of an illumination compensation model. In a first scheme, the parameters are explicitly signaled in the bitstream. Thus, the decoder can decode the related syntax and acquire the parameters. In a second scheme, the parameters are not signaled. Instead, the parameters are derived using the already reconstructed pixels.

A video encoder, decoder, and corresponding methods are provided for encoding an input picture or image block using adaptive illumination compensation for each scheme. An exemplary encoder includes an element to compute parameters in an illumination compensation model and an element to apply the illumination compensation model on the predicted data. An exemplary method includes receiving a substantially uncompressed image block, computing illumination compensation parameters, performing displaced intra prediction and/or template matching prediction to get the prediction block, applying illumination compensation parameters on the prediction block to get an illumination compensated block, subtracting the illumination compensated block from the substantially uncompressed image block, and encoding the difference between the substantially uncompressed image block and the displaced intra prediction or template matching prediction.

Thus, in accordance with one or more embodiments, we propose adaptive illumination compensation for intra prediction. We will focus on non-local intra prediction techniques, using template matching prediction (TMP) and displaced intra prediction (DIP) as examples to explain the present principles.

Turning to FIG. 9, an example of non-local intra prediction is indicated generally by the reference numeral 900. With regard to notation, a reconstructed picture is denoted by the reference numeral 960, a non-predicted picture is denoted by the reference numeral 950, the original block is denoted by Y and its corresponding reconstructed block and template are denoted by Ŷ (not shown) and X, respectively. The predicted block of Y is denoted as P and the corresponding template of P is denoted as Q. The residue signal is denoted as R and the reconstructed residue signal is denoted as $\hat{R}$. Hence, $P_1$ and $P_2$ respectively represent a first prediction and a second prediction, and $Q_1$ and $Q_2$ respectively represent the templates of the first and the second predictions.

In accordance with the present principles, instead of applying R=Y−P at the encoder, or $\hat{Y}$=P+$\hat{R}$ at the decoder, we propose R=Y−Ψ(P) at the encoder, or $\hat{Y}$=Ψ(P)+$\hat{R}$ at the decoder, where Ψ[•] denotes in an embodiment, the IC/weighting function. We can also apply some filter inside Ψ[•] or Ψ[•] can stand for a linear and/or non-linear operation(s) on P. To simplify the explanation, a filter can be part of Ψ[•], or we can presume Ψ[•] to be a filtering step.

In one embodiment of Ψ[•], for simplicity, we suggest using the polynomial function $y=a_0+a_1x+a_2x^2 \ldots +a_nx^n$, where n=−1, 0, 1, . . . . It is to be noted that n=−1 means the above method is not used. The degree of polynomials n can be specified in the header or using some high level syntax. If n=1, it is the linear model.

In the following, we will use a linear model as an example to explain how our invention works for adaptive illumination compensation. In an embodiment, we can represent the illumination compensation predicted signal as follows:

$$\hat{P}=aP+b, \quad (1)$$

where a is a multiplicative weighting factor and b is an additive offset, where both can jointly compensate for contrast and brightness. In another embodiment, when illumination compensation is applied to very small regions, we can presume that contrast adaptation is not that important, which means we can set the parameter a=1. Thus, the model in Equation (1) turns into an offset-only model as follows:

$$\hat{P}=P+b. \quad (2)$$

As for the signaling of model parameters, we propose two schemes: explicit signaling; or implicit derivation. In one embodiment, the parameters in Equation (1) can be explicitly signaled at the block level, or by using one or more high-level syntax elements, such as, for example, but not limited to, in a slice header, picture parameter set (PPS), sequence parameter set (SPS), network abstraction layer (NAL) unit header, or Supplemental Enhancement Information (SEI) message. We call this method explicit illumination compensation. In another embodiment, the parameters in Equation (1) can be implicitly derived at both the encoder and the decoder. We call this method implicit illumination compensation.

In the following, we use block level illumination compensation as an example. In consideration of the same, we further show examples of how explicit and implicit illumination compensation work.

Explicit Illumination Compensation

We first explain how explicit illumination compensation works for DIP.

In an embodiment, at the encoder side, during the search procedure, we look for a prediction block that minimizes the following cost/distance:

$$D=\|Y-(aP+b)\|$$

where a is a multiplicative weighting factor and b is an additive offset, where both can jointly compensate for contrast and brightness. With respect to Equation (3), a and b can be resolved using Least Square Fitting/Linear Regression. Of course, the present principles are not limited to the preceding cost measurements and, thus, other cost measurements may also be employed in accordance with the teachings of the present principles provided herein, while maintaining the spirit of the present principles. If the simplified model as in Equation (2) is used, mean-removed distance criterion can be used, i.e., b=E(Y)−E(P), where EH denotes the expectation function. The best prediction is found with the smallest distance. The corresponding parameters are then signaled by some data syntax. The syntax values can be absolutely coded or differentially/predictively coded. TABLE 1 shows exemplary syntax for illumination compensation offset. The syntax may be signaled for Equation (2).

TABLE 1

| mb_pred( mb_type ) { | C | Descriptor |
|---|---|---|
| if ( ic_enable && NumMbPart( mb_type ) == 1 ) { | | |
|   mb_ic_flag | 2 | u(1)|ae(v) |
|   if ( mb_ic_flag ) | | |
|     dpcm_of_ic_offset | 2 | se(v)|ae(v) |
|   } | | |
| } | | | mb_ic_flag equal to 1 specifies that illumination compensation is used for the current macroblock. mb_ic_flag equal to 0 specifies that illumination compensation is not used for the current macroblock. The default value for mb_ic_flag is zero.

dpcm_of_ic_offset specifies the illumination compensation offset to be used for the current macroblock. Illumination compensation is coded differentially with respect to a function of the surrounding neighboring data available at the decoder.

In an embodiment, the overall procedure in our exemplary encoder is as follows. For each prediction candidate, we calculate the compensation parameters a and b using linear regression by minimizing the template distance in Equation (3). The compensated distance is computed by minimizing the distortion defined in Equation (3). The best prediction, which has the minimum distance among all the prediction candidates, is selected. The illumination compensation predicted signal is generated by Equation (1). The residue is generated and coded. The illumination compensation parameters and displacement vectors are signaled at the block level.

In an embodiment, at the decoder, the displacement vectors and illumination compensation model parameters are received and decoded from the bitstream. Then the illumination compensation prediction signal is generated by Equation (1) using illumination compensation model parameters and displacement vectors. The decoded residue is added to the illumination compensation predicted signal.

For template matching prediction, if only one template is used, the procedure is the same as the displaced intra prediction case, except that the search would be based on templates. Hence, instead of using Equation (3), we use the following to find the best prediction:

$$D=\|X-(aQ+b)\| \quad (4)$$

where a is a multiplicative weighting factor and b is an additive offset, where both can jointly compensate for contrast and brightness. Since X and Q are both available at the encoder and the decoder, for each template search, we can compute the corresponding a and b using linear regression. Indeed, X and Q are the neighboring data to the actual data that is under prediction (Y) and used for prediction (P), respectively. After we find the best template, we will use Equation (3) to compute the model parameters which are signaled at the block level. The approach can be directly applied to multiple templates cases.

In an embodiment, the overall procedure in our exemplary encoder is as follows. For each prediction candidate, we calculate the compensation parameters a and b using linear regression by minimizing the template distance in Equation (4). The compensated distance is computed using Equation (4). The best prediction, which has the minimum template distance among all the prediction candidates, is selected. The parameters a and b are computed by Equation (3) and signaled at the block level. The illumination compensation predicted signal is generated by Equation (1). The residue is generated and coded.

In an embodiment, at the decoder, the parameters are received and decoded from the bitstream. Then the same template search procedure at the encoder is performed. That is, for each prediction candidate, we calculate the compensation parameters, a and b using linear regression by minimizing the template distance in Eq. (4). The compensated template distance is computed using Equation (4). The best prediction, which has minimum template distance among all prediction candidates, is selected. The illumination compensated prediction signal is generated by Equation (1) using the decoded IC parameters. The decoded residue is added to the illumination compensation predicted signal.

Turning to FIG. 10, an exemplary method for encoding picture data using displaced intra prediction (DIP) and explicit illumination compensation is indicated generally by the reference numeral 1000.

The method 1000 includes a start block 1005 that passes control to a loop limit block 1010. The loop limit block 1010 begins a loop using a variable i, where i has a range from 0 to the number of macroblocks minus 1 (num_MBs_minus1), and passes control to a decision block 1015. The decision block 1015 determines whether or not the current mode is DIP mode. If so, the control is passed to a function block 1020. Otherwise, control is passed to a function block 1045.

The function block 1020, for each search candidate in DIP, computes illumination compensation parameters, and performs illumination compensation to best approximate the current block, and paSses control to a function block 1025. The function block 1025 selects the candidate with the least cost given the current block, and passes control to a function block 1030. The function block 1030 computes the prediction residue of the selected candidate given the current block, and passes control to a function block 1035. The function block 1035 entropy codes displacement vectors, illumination compensation parameters, residue, and other syntax, and passes control to a loop limit block 1040. The loop limit block 1040 ends the loop, and passes control to an end block 1099.

The function block 1045 performs an encoding process for non-DIP modes, and passes control to the loop limit block 1040.

Turning to FIG. 11, an exemplary method for decoding picture data using displaced intra prediction (DIP) and explicit illumination compensation is indicated generally by the reference numeral 1100.

The method 1100 includes a start block 1105 that passes control to a function block 1110. The function block 1110 parses the bitstream, and passes control to a loop limit block 1115. The loop limit block 1115 begins a loop using a variable i, where i has a range from 0 to the number of macroblocks minus 1 (num_MBs_minus1), and passes control to a decision block 1120. The decision block 1120 determines whether or not the current mode is DIP mode. If so, the control is passed to a function block 1125. Otherwise, control is passed to a function block 1145.

The function block 1125 decodes displacement vectors, illumination compensation parameters, residue, and other syntax, and passes control to a function block 1130. The function block 1130 performs illumination compensation for the current block, and passes control to a function block 1135. The function block 1135 adds the residue to the current block, and passes control to a loop limit block 1140. The loop limit block 1140 ends the loop, and passes control to an end block 1199.

The function block 1145 performs a decoding process for non-DIP modes, and passes control to the loop limit block 1140.

Turning to FIG. 12, an exemplary method for encoding picture data using template matching prediction (TMP) and explicit illumination compensation is indicated generally by the reference numeral 1200.

The method 1200 includes a start block 1205 that passes control to a loop limit block 1210. The loop limit block 1210 begins a loop using a variable i, where i has a range from 0 to the number of macroblocks minus 1 (num_MBs_minus1), and passes control to a decision block 1215. The decision block 1215 determines whether the current mode is TMP mode. If so, then control is passed to a function block 1220. Otherwise, control is passed to a function block 1250.

The function block 1220, for each search candidate in DIP, computes illumination compensation parameters, and performs illumination compensation to best approximate the current block, and passes control to a function block 1225. The function block 1225 selects the candidate with the least cost given the current block, and passes control to a function block 1230. The function block 1230 computes illumination compensation parameters of the current block, performs illumination compensation of the current block, and passes control to a function block 1235. The function block 1235 computes the residue of the current block, and passes control to a function block 1240. The function block 1240 entropy codes the illumination parameters, residue, and other syntax, and passes control to a loop limit block 1245. The loop limit block 1245 ends the loop, and passes control to an end block 1299.

The function block 1250 performs an encoding process for non-TMP modes, and passes control to the loop limit block 1245.

Turning to FIG. 13, an exemplary method for decoding picture data using template matching prediction (TMP) and explicit illumination compensation is indicated generally by the reference numeral 1300.

The method 1300 includes a start block 1305 that passes control to a function block 1310. The function block 1310 parses the bitstream, and passes control to a loop limit block 1315. The loop limit block 1315 begins a loop using a variable i, where i has a range from 0 to the number of macroblocks minus 1 (num_MBs_minus1), and passes control to a decision block 1320. The decision block 1320 determines whether or not the current mode is DIP mode. If so, the control is passed to a function block 1325. Otherwise, control is passed to a function block 1355.

The function block 1325 decodes the illumination compensation parameters, residue, and other syntax, and passes control to a function block 1330. The function block 1330, for each search candidate in TMP, computes illumination compensation parameter, and performs illumination compensation to best approximate the current block, and passes control to a function block 1335. The function block 1335 selects the candidate with the least cost for the current block's template, and passes control to a function block 1340. The function block 1340 performs illumination compensation for the current block, and passes control to a function block 1345. The function block 1345 adds the residue to the current block, and passes control to a loop limit block 1350. The loop limit block 1350 ends the loop, and passes control to an end block 1399.

The function block 1355 performs a decoding process for non-TMP modes, and passes control to the loop limit block 1350.

Implicit Illumination Compensation

We will first use TMP to explain how implicit illumination compensation works. In TMP, since auto-regressive search based on templates is used, and the same search procedure can be performed in both the encoder and the decoder, we can embed within the template search the derivation of a and b parameters by minimizing Equation (4) for each template candidate. The same parameters can then be used for prediction as in Equation (1).

The overall procedure in an exemplary encoder is as follows. For each prediction candidate, we calculate the compensation parameters a and b using linear regression by minimizing the template distance in Equation (4). The compensated distance is computed using Equation (4). The best prediction, which has minimum template distance among all prediction candidates, is selected. The same parameters a and b computed from template matching prediction are used in Equation (1) in order to generate the illumination compensation predicted signal. The residue is generated and coded.

In an exemplary decoder, the same template search procedure at the encoder is performed. That is, for each prediction candidate, we calculate the compensation parameters a and b using linear regression by minimizing template distance in Equation (4). The compensated distance is computed using Equation (4). The best prediction, which has minimum template distance among all prediction candidates, is selected. The same parameters a and b computed from template matching prediction are used in Equation (1) in order to generate the illumination compensation predicted signal. The decoded residue is added to the illumination compensation predicted signal.

For DIP, we can estimate the parameters using the templates of the current signal and predicted signal in the same way as TMP.

In an embodiment, the overall procedure at an exemplary encoder is as follows. For each prediction candidate, we calculate the compensation parameters a and b using linear regression by minimizing template distance in Equation (4). The compensated distance is computed using Equation (3). The best prediction, which has the minimum distance according to Equation (3) among all prediction candidates, is selected. The illumination compensation predicted signal is generated using Equation (1). The residue is generated and coded. The displacement vector is signaled.

At the decoder, the displacement vector is received and decoded. Then, for the targeted prediction candidate generated by the displacement vector, we calculate the compensation parameters a and b using linear regression by minimizing template distance in Eq. (4). The illumination compensation predicted signal is generated using Equation (1). The decoded residue is added to the illumination compensation predicted signal.

Turning to FIG. 14, an exemplary method for encoding picture data using template matching prediction (TMP) and implicit illumination compensation is indicated generally by the reference numeral 1400.

The method 1400 includes a start block 1405 that passes control to a loop limit block 1410. The loop limit block 1410 begins a loop using a variable i, where i has a range from 0 to the number of macroblocks minus 1 (num_MBs_minus1), and passes control to a decision block 1415. The decision block 1415 determines whether or not the current mode is TMP mode. If so, the control is passed to a function block 1420. Otherwise, control is passed to a function block 1450.

The function block 1420, for each search candidate in TMP, computes illumination compensation parameters, performs illumination compensation for the current block's template, and passes control to a function block 1425. The function block 1425 selects the candidate with the least cost for the current block's template, stores the corresponding illumination compensation parameters, and passes control to a function block 1430. The function block 1430 performs illumination compensation for the current block, and passes control to a function block 1435. The function block 1435 computes the residue of the current block, and passes control to a function block 1440. The function block 1440 entropy codes the residue and other syntax, and passes control to a loop limit block 1445. The loop limit block 1445 ends the loop, and passes control to an end block 1499.

The function block 1450 performs an encoding process for non-TMP modes, and passes control to the loop limit block 1445.

Turning to FIG. 15, an exemplary method for decoding picture data using template matching prediction (TMP) and implicit illumination compensation is indicated generally by the reference numeral 1500.

The method 1500 includes a start block 1505 that passes control to a function block 1510. The function block 1510 parses the bitstream, and passes control to a loop limit block 1515. The loop limit block 1515 begins a loop using a variable i, where i has a range from 0 to the number of macroblocks minus 1 (num_MBs_minus1), and passes control to a decision block 1520. The decision block 1520 determines whether or not the current mode is DIP mode. If so, the control is passed to a function block 1525. Otherwise, control is passed to a function block 1555.

The function block 1525 decodes the residue and other syntax, and passes control to a function block 1530. The function block 1530, for each search candidate in TMP, computes illumination compensation parameter, and performs illumination compensation to best approximate the current block, and passes control to a function block 1535. The function block 1535 selects the candidate with the least cost for the current block's template, stores the corresponding illumination compensation parameters, and passes control to a function block 1540. The function block 1540 performs illumination compensation for the current block, and passes control to a function block 1545. The function block 1545 adds the residue to the current block, and passes control to a loop limit block 1550. The loop limit block 1550 ends the loop, and passes control to an end block 1599.

The function block 1555 performs a decoding process for non-TMP modes, and passes control to the loop limit block 1550.

Turning to FIG. 16, an exemplary method for encoding picture data using displaced intra prediction (DIP) and implicit illumination compensation is indicated generally by the reference numeral 1600.

The method 1600 includes a start blocks 1605 that passes control to a loop limit block 1610. The loop limit block 1610 begins a loop using a variable i, where i has a range from 0 to the number of macroblocks minus 1 (num_MBs_minus1), and passes control to a decision block 1615. The decision block 1615 determines whether or not the current mode is DIP mode. If so, the control is passed to a function block 1620. Otherwise, control is passed to a function block 1645.

The function block 1620, for each search candidate in DIP, computes illumination compensation parameters using the template, and performs illumination compensation for the current block, and passes control to a function block 1625. The function block 1625 selects the candidate with the least cost for the current block, and passes control to a function block 1630. The function block 1630 computes the residue of the current block, and passes control to a function block 1635. The function block 1635 entropy codes displacement vectors, residue, and other syntax, and passes control to a loop limit block 1640. The loop limit block 1640 ends the loop, and passes control to an end block 1699.

The function block 1645 performs an encoding process for non-DIP modes, and passes control to the loop limit block 1640.

Turning to FIG. 17, an exemplary method for decoding picture data using displaced intra prediction (DIP) and implicit illumination compensation is indicated generally by the reference numeral 1700.

The method 1700 includes a start block 1705 that passes control to a function block 1710. The function block 1710 parses the bitstream, and passes control to a loop limit block 1715. The loop limit block 1715 begins a loop using a variable i, where i has a range from 0 to the number of macroblocks minus 1 (num_MBs_minus1), and passes control to a decision block 1720. The decision block 1720 determines whether or not the current mode is DIP mode. If so, the control is passed to a function block 1725. Otherwise, control is passed to a function block 1745.

The function block 1725 decodes displacement vectors and other syntax, and passes control to a function block 1730. The function block 1730 computes illumination compensation parameters using the template, and passes control to a function block 1735. The function block 1735 performs illumination compensation for the current block, and passes control to a function block 1740. The function block 1740 adds the residue to the current block, and passes control to a loop limit block 1745. The loop limit block 1745 ends the loop, and passes control to an end block 1799.

The function block 1745 performs a decoding process for non-DIP modes, and passes control to the loop limit block 1740.

A description will now be given of some of the many attendant advantages/features of the present invention, some of which have been mentioned above. For example, one advantage/feature is an apparatus having an encoder for encoding a picture using non-local intra prediction. The encoder includes an illumination compensation processing unit (an illumination compensation portion) for applying illumination compensation to predicted data obtained from the non-local intra prediction.

Another advantage/feature is the apparatus having the encoder as described above, wherein the illumination compensation is applied adaptively to the predicted data. The predicted data includes at least one of a displaced intra prediction and a template matching prediction.

Yet another advantage/feature is the apparatus having the encoder as described above, wherein the illumination compensation is modeled to obtain a resultant model. The resultant model is based on at least one of a polynomial function, a linear function, and a nonlinear function.

Still another advantage/feature is the apparatus having the encoder wherein the illumination compensation is modeled to obtain a resultant model as described above, wherein the resultant model is a linear model based on a first order polynomial.

Moreover, another advantage/feature is the apparatus having the encoder wherein the resultant model is a linear model based on a first order polynomial as described above, wherein the first order polynomial is an offset only function based on an additive constant.

Further, another advantage/feature is the apparatus having the encoder wherein the illumination compensation is modeled to obtain a resultant model as described above, wherein parameters of the resultant model are solved using a least square function.

Also, another advantage/feature is the apparatus having the encoder wherein the illumination compensation is modeled to obtain a resultant model as described above, wherein the non-local intra prediction is applied to at least one of luminance data, color data and depth view data.

Additionally, another advantage/feature is the apparatus having the encoder as described above, wherein the illumination compensation is modeled to obtain a resultant model. Parameters of the resultant model are explicitly signaled using at least one of at least one block level syntax element and at least one high level syntax element.

Moreover, another advantage/feature is the apparatus having the encoder as described above, wherein the illumination compensation is modeled to obtain a resultant model. Parameters of the resultant model are derived from a template matching procedure applied to a current block of the picture and a corresponding predicted block with respect to the current block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a hardware encoder for encoding a picture using non-local intra prediction, wherein non-local intra prediction uses decoded areas of a current picture as predicted data for current data being encoded, and wherein said encoder includes an implicit illumination compensation processing portion for applying illumination compensation to predicted data obtained from the non-local intra prediction,
wherein the illumination compensation is modeled to obtain a resultant model, and parameters of the resultant model are derived using linear regression from a non-local picture data prediction technique that minimizes a distance between luminance and chrominance data to be encoded and luminance and chrominance data of a weighted and offset predicted signal and uses information located beyond local neighboring data within a decoded portion of the picture, wherein the parameters of the resultant model are implicitly signaled to a corresponding decoder.

2. The apparatus of claim 1, wherein the illumination compensation is applied adaptively to the predicted data, the predicted data having been predicted by at least one of a displaced intra prediction and a template matching prediction.

3. The apparatus of claim 1, wherein the resultant model is based on at least one of a polynomial function, a linear function, and a nonlinear function.

4. The apparatus of claim 3, wherein the resultant model is a linear model based on a first order polynomial.

5. The apparatus of claim 4, wherein the first order polynomial is an offset only function based on an additive constant.

6. The apparatus of claim 3, wherein parameters of the illumination compensation are solved using a least square function.

7. The apparatus of claim 3, wherein the non-local intra prediction is applied to at least one of luminance data, color data and depth view data.

8. A method, comprising:
encoding a picture using non-local intra prediction, wherein non-local intra prediction uses decoded areas of a current picture as predicted data for current data being encoded, and wherein said encoding step includes applying illumination compensation to predicted data obtained from the non-local intra prediction,
wherein the illumination compensation is modeled to obtain a resultant model, and parameters of the resultant model are derived using linear regression from a non-local picture data prediction technique that minimizes a distance between luminance and chrominance data to be encoded and luminance and chrominance data of a weighted and offset predicted signal and uses information located beyond local neighboring data within a decoded portion of the picture, wherein the parameters of the resultant model are implicitly signaled to a corresponding decoder.

9. The method of claim 8, wherein the illumination compensation is applied adaptively to the predicted data, the predicted data having been predicted by at least one of: a displaced intra prediction and a template matching prediction.

10. The method of claim 8, wherein the resultant model is based on at least one of: a polynomial function, a linear function, and a nonlinear function.

11. The method of claim 10, wherein the resultant model is a linear model based on a first order polynomial.

12. The method of claim 11, wherein the first order polynomial is an offset only function based on an additive constant.

13. The method of claim 10, wherein parameters of the illumination compensation are solved using a least square function.

14. The method of claim 10, wherein the non-local intra prediction is applied to at least one of luminance data, color data and depth view data.

15. An apparatus, comprising:
a hardware decoder for decoding a picture using non-local intra prediction, wherein non-local intra prediction uses decoded areas of a current picture as predicted data for current data being decoded, and wherein said decoder includes an implicit illumination compensation processing portion for applying illumination compensation to predicted data obtained from the non-local intra prediction,
wherein the illumination compensation is modeled to obtain a resultant model, and parameters of the resultant model are derived using linear regression from a non-local picture data prediction technique that minimizes a distance between luminance and chrominance data to be encoded and luminance and chrominance data of a weighted and offset predicted signal and uses information located beyond local neighboring data within a decoded portion of the picture, wherein the parameters of the resultant model are implicitly determined.

16. The apparatus of claim 15, wherein the illumination compensation is applied adaptively to the predicted data, the predicted data having been predicted by at least one of: a displaced intra prediction and a template matching prediction.

17. The apparatus of claim 15, wherein the resultant model is based on at least one of: a polynomial function, a linear function, and a nonlinear function.

18. The apparatus of claim 17, wherein the resultant model is a linear model based on a first order polynomial.

19. The apparatus of claim 18, wherein the first order polynomial is an offset only function based on an additive constant.

20. The apparatus of claim 17, wherein parameters of the illumination compensation are solved using a least square function.

21. The apparatus of claim 17, wherein the non-local intra prediction is applied to at least one of: luminance data, color data and depth view data.

22. A method, comprising:
decoding a picture using non-local intra prediction, wherein non-local intra prediction uses decoded areas of a current picture as predicted data for current data being decoded, and wherein said decoding step includes applying illumination compensation to predicted data obtained from the non-local intra prediction,
wherein the illumination compensation is modeled to obtain a resultant model, and parameters of the resultant model are derived using linear regression from a non-local picture data prediction technique that minimizes a distance between luminance and chrominance data to be encoded and luminance and chrominance data of a weighted and offset predicted signal and uses information located beyond local neighboring data within a decoded portion of the picture, wherein the parameters of the resultant model are implicitly determined.

23. The method of claim 22, wherein the illumination compensation is applied adaptively to the predicted data, the predicted data having been predicted by at least one of: a displaced intra prediction and a template matching prediction.

24. The method of claim 22, wherein the resultant model is based on at least one of: a polynomial function, a linear function, and a nonlinear function.

25. The method of claim 24, wherein the resultant model is a linear model based on a first order polynomial.

26. The method of claim 25, wherein the first order polynomial is an offset only function based on an additive constant.

27. The method of claim 24, wherein parameters of the illumination compensation are solved using a least square function.

28. The method of claim 24, wherein the non-local intra prediction is applied to at least one of: luminance data, color data and depth view data.

* * * * *